United States Patent
Kirihara et al.

(10) Patent No.: US 8,023,033 B2
(45) Date of Patent: Sep. 20, 2011

(54) VIEWFINDER AND IMAGING APPARATUS

(75) Inventors: Toru Kirihara, Kanagawa (JP); Eiji Kaji, Kanagawa (JP)

(73) Assignee: Sony Corporation (JP)

( * ) Notice: Subject to any disclaimer, the term of this patent is extended or adjusted under 35 U.S.C. 154(b) by 806 days.

(21) Appl. No.: 12/070,251

(22) Filed: Feb. 14, 2008

(65) Prior Publication Data

US 2008/0198255 A1 Aug. 21, 2008

(30) Foreign Application Priority Data

Feb. 16, 2007 (JP) ................ P2007-036534

(51) Int. Cl.
*H04N 5/225* (2006.01)
(52) U.S. Cl. .............. 348/341; 348/333.01; 348/333.02; 348/333.06; 348/333.07; 396/383; D16/200
(58) Field of Classification Search ............ 396/383
See application file for complete search history.

(56) References Cited

U.S. PATENT DOCUMENTS

| | | | |
|---|---|---|---|
| 4,550,343 A | 10/1985 | Nakatani | |
| 2004/0160523 A1* | 8/2004 | Mogi et al. | 348/333.07 |
| 2005/0041130 A1* | 2/2005 | Yoon et al. | 348/333.01 |
| 2006/0140621 A1* | 6/2006 | Misawa | 396/374 |
| 2006/0227235 A1* | 10/2006 | Miura | 348/333.01 |

FOREIGN PATENT DOCUMENTS

| | | |
|---|---|---|
| JP | 60-019269 U | 1/1985 |
| JP | 10-322575 A | 12/1998 |
| JP | 11-252417 A | 9/1999 |
| JP | 2004-147232 A | 5/2004 |
| JP | 2005-210677 A | 8/2005 |

OTHER PUBLICATIONS

Japanese Office Action issued in corresponding Japanese Patent Appln. No. 2007-036534 on Dec. 26, 2008.

* cited by examiner

*Primary Examiner* — Jason Chan
*Assistant Examiner* — Yih-Sien Kao
(74) *Attorney, Agent, or Firm* — Lerner, David, Littenberg, Krumholz & Mentlik, LLP

(57) ABSTRACT

A viewfinder includes: a main unit to be detachably attached to a camera body; and a display unit including a display portion on which a picture to be imaged at the camera body side; wherein the display portion includes a supporting member, a display panel including a display surface, a first connecting mechanism configured to connect the main unit and the supporting member so as to rotate, and a second connecting mechanism configured to connect the supporting member and the display panel so as to swing between a laid state in which the display panel is laid on the supporting member and a standing state in which the display panel stands from the supporting member; wherein the first connecting mechanism is configured such that the supporting member can rotate within a range of at least not less than 180 degrees on the main unit.

9 Claims, 33 Drawing Sheets

VIEWFINDER AND IMAGING APPARATUS

CROSS REFERENCES TO RELATED APPLICATIONS

The present application claims priority from Japanese Patent Application No. JP 2007-036534, filed in the Japanese Patent Office on Feb. 16, 2007, the entire content of which is incorporated herein by reference.

BACKGROUND OF THE INVENTION

1. Field of the Invention

The present invention relates to a viewfinder and an imaging apparatus.

2. Description of the Related Art

Some commercial imaging apparatuses which are employed at a broadcasting station and so forth include a camera body for shooting a subject to generate picture signals, and a viewfinder, which is attached to a camera body, for displaying a picture based on picture signals. With this type of imaging apparatus, a cameraman shoots while carrying the camera body on the shoulder and looking into the viewfinder.

As the viewfinder of such an imaging apparatus, a viewfinder has been proposed wherein are detachably provided a display portion which includes a display panel, and displays a picture on the display panel, and an eyepiece unit, which is detachably attached to the display portion, for enlarging the picture displayed on the display panel (see Japanese Unexamined Patent Application Publication No. 2004-147232).

With this viewfinder, the display panel is provided so as to rotate such that the cameraman can shoot with the camera body being removed from the shoulder and being directed upward or downward, and also the eyepiece unit is provided so as to rotate integrally with the display panel in a state of being detached to the display portion.

Also, with this viewfinder, the cameraman can remove the eyepiece unit from the display portion depending on a shooting situation, whereby the cameraman can shoot while visually recognizing the picture displayed on the display panel directly.

SUMMARY OF THE INVENTION

Note however, with the above-mentioned viewfinder, a state in which the eyepiece unit is detached from the display portion is a state in which the display surface of the display panel is directed to one direction constantly, and for example, a state in which the camera body is carried on the shoulder is a state in which the display surface of the display panel is directed to the lateral direction, so it is necessary for the cameraman to look into the display surface of the display panel from the lateral direction of the camera body in a state in which the camera body is carried on the shoulder, which causes inconvenience, such as forcing the cameraman to take an unnatural posture, and reducing the flexibility of a shooting angle.

There has been recognized a need to provide a viewfinder and an imaging apparatus which are advantageous to allowing a cameraman to visually recognize the display surface of the display panel in a state in which the eyepiece unit is detached from the display portion, and realizing improvement in ease of use.

A viewfinder according to an embodiment of the present invention includes: a main unit to be detachably attached to a camera body; and a display unit including a display portion on which a picture to be imaged at the camera body side; wherein the display portion includes a supporting member, a display panel including a display surface, a first connecting mechanism configured to connect the main unit and the supporting member so as to rotate, and a second connecting mechanism configured to connect the supporting member and the display panel so as to swing between a laid state in which the display panel is laid on the supporting member and a standing state in which the display panel stands from the supporting member; wherein the first connecting mechanism is configured such that the supporting member can rotate within a range of at least not less than 180 degrees on the main unit.

Also, an imaging apparatus according to an embodiment of the present invention includes: a camera body for imaging a picture, which extends forward and backward; and a display unit; wherein the display unit includes a main unit which is detachably attached to the camera body, and a display portion on which a picture imaged at the camera body side is displayed; and wherein the display portion includes a supporting member, a display panel including a display surface, a first connecting mechanism configured to connect the main unit and the supporting member so as to rotate, and a second connecting mechanism configured to connect the supporting member and the display panel so as to swing between a laid state in which the display panel is laid on the supporting member and a standing state in which the display panel stands from the supporting member; and wherein the first connecting mechanism is configured such that the supporting member can rotate within a range of at least not less than 180 degrees on the main unit.

Also, an imaging apparatus according to an embodiment of the present invention includes: a camera body for imaging a picture, which extends forward and backward; and a display unit; wherein the display unit includes a main unit which is provided integrally with the camera body, and a display portion on which a picture imaged at the camera body side is displayed; and wherein the display portion includes a supporting member, a display panel including a display surface, a first connecting mechanism configured to connect the main unit and the supporting member so as to rotate, and a second connecting mechanism configured to connect the supporting member and the display panel so as to swing between a laid state in which the display panel is laid on the supporting member and a standing state in which the display panel stands from the supporting member; and wherein the first connecting mechanism is configured such that the supporting member can rotate within a range of at least not less than 180 degrees on the main unit.

According to an embodiment of the present invention, following the display panel being set to a standing state, upon the display surface being directed backward, a cameraman can shoot while visually recognizing the picture displayed on the display surface, and following the display panel being set to a standing state, upon the display surface being directed forward, the cameraman can take his/her own picture, or the picture of a subject behind him/her while visually recognizing the picture displayed on the display surface.

DESCRIPTION OF THE PREFERRED EMBODIMENTS

First Embodiment

Figure 1:
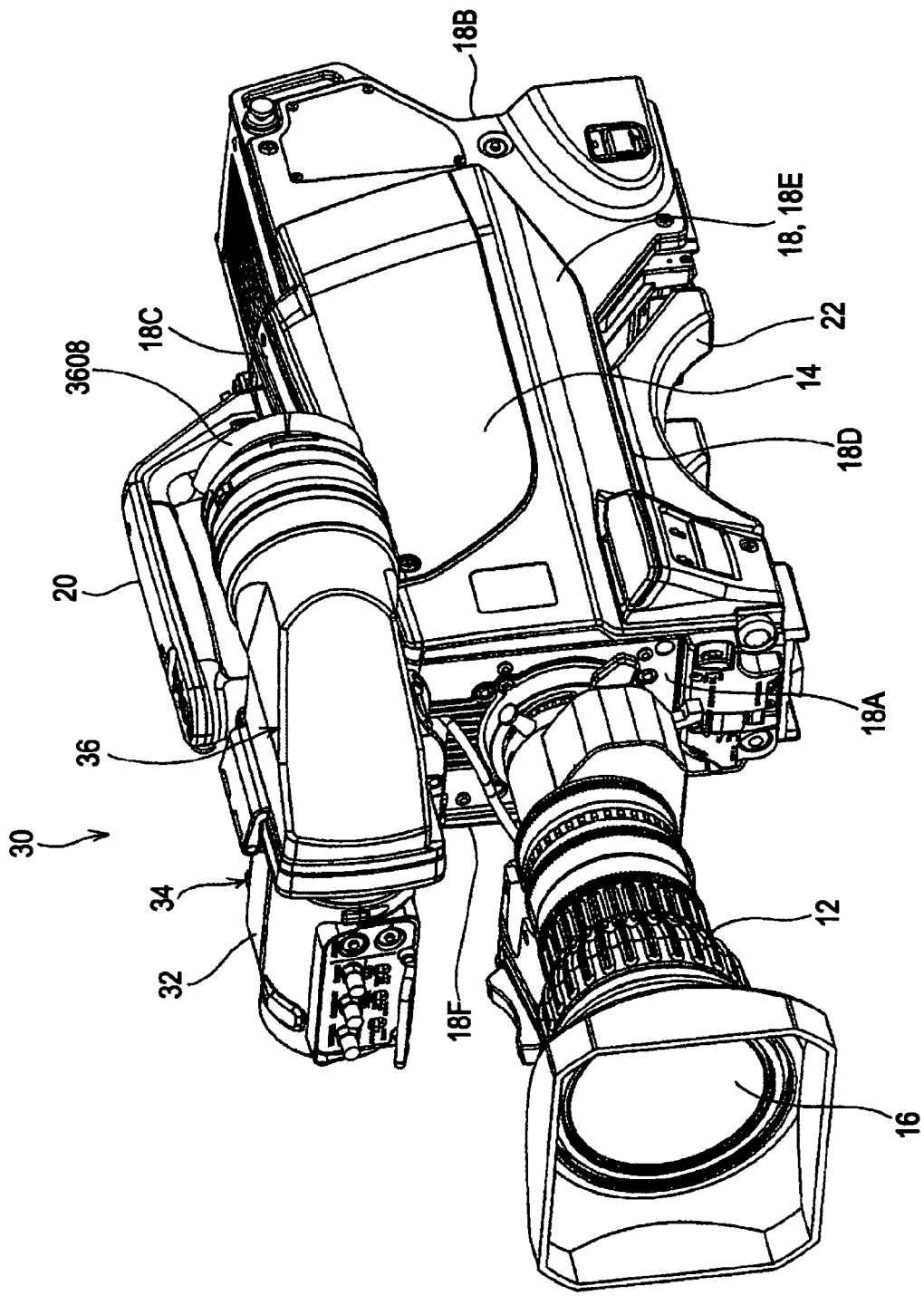
FIG. 1 is a perspective view of an imaging apparatus 10 to which a viewfinder 30 is attached.
Figure 2:
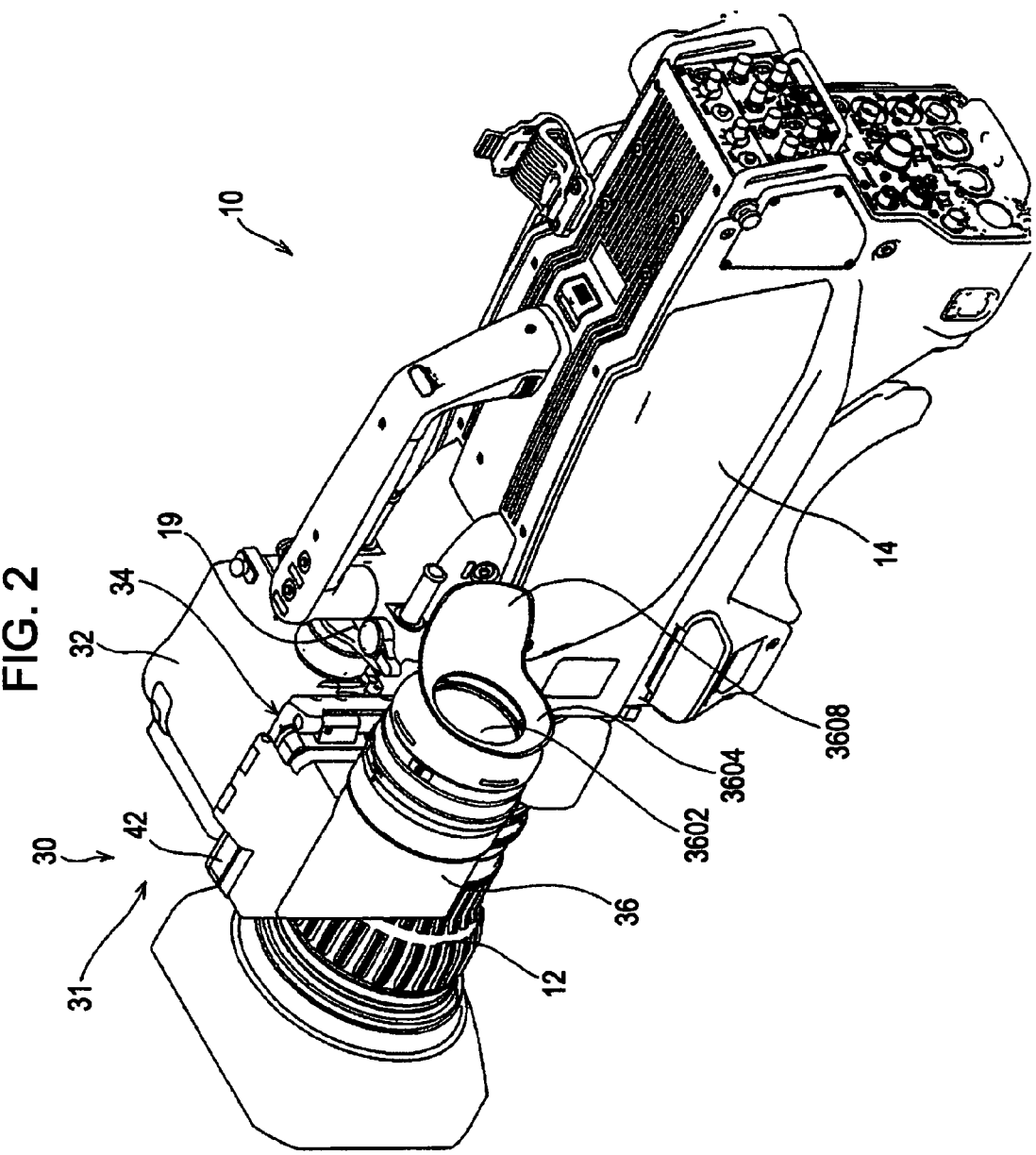
FIG. 2 is a perspective view of the imaging apparatus 10 to which the viewfinder 30 is attached.
Figure 3:
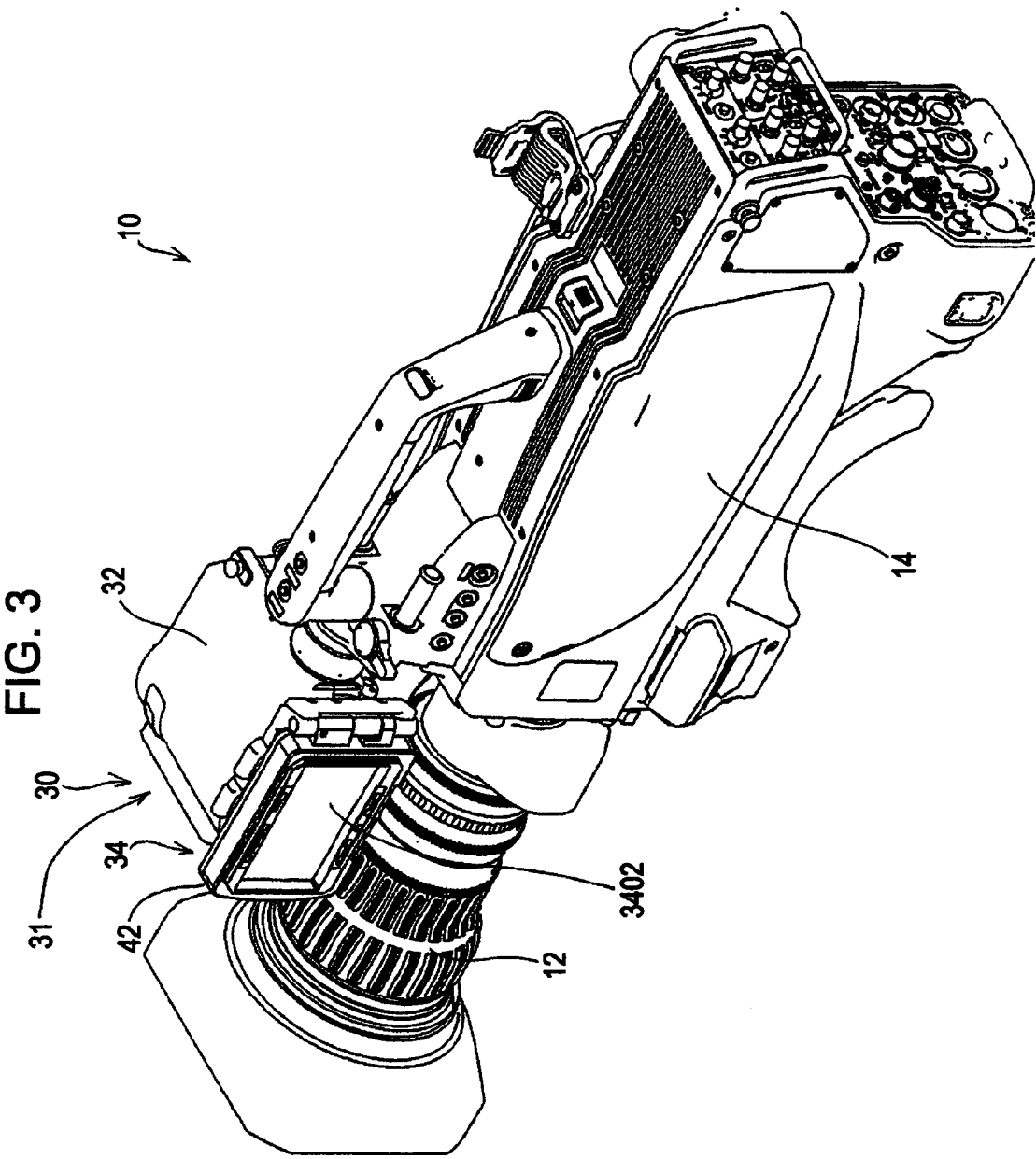
FIG. 3 is a perspective view of the imaging apparatus 10 which illustrates a state in which an eyepiece 36 is removed from the viewfinder 30, and a display panel 42 faces the left lateral direction.
Figure 4:
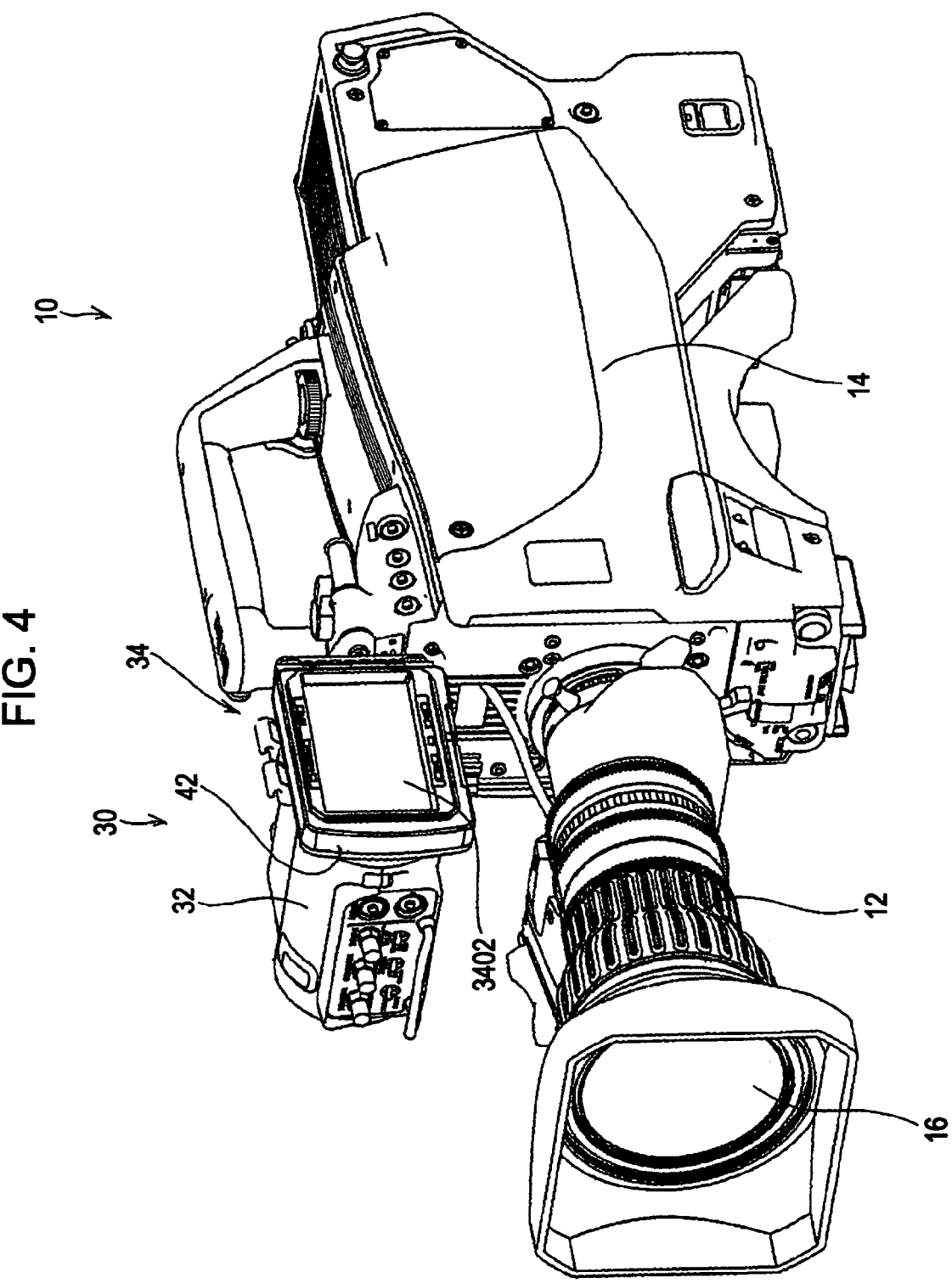
FIG. 4 is a perspective view of the imaging apparatus 10 which illustrates a state in which the eyepiece 36 is removed from the viewfinder 30, and the display panel 42 faces the left lateral direction.
Figure 5:
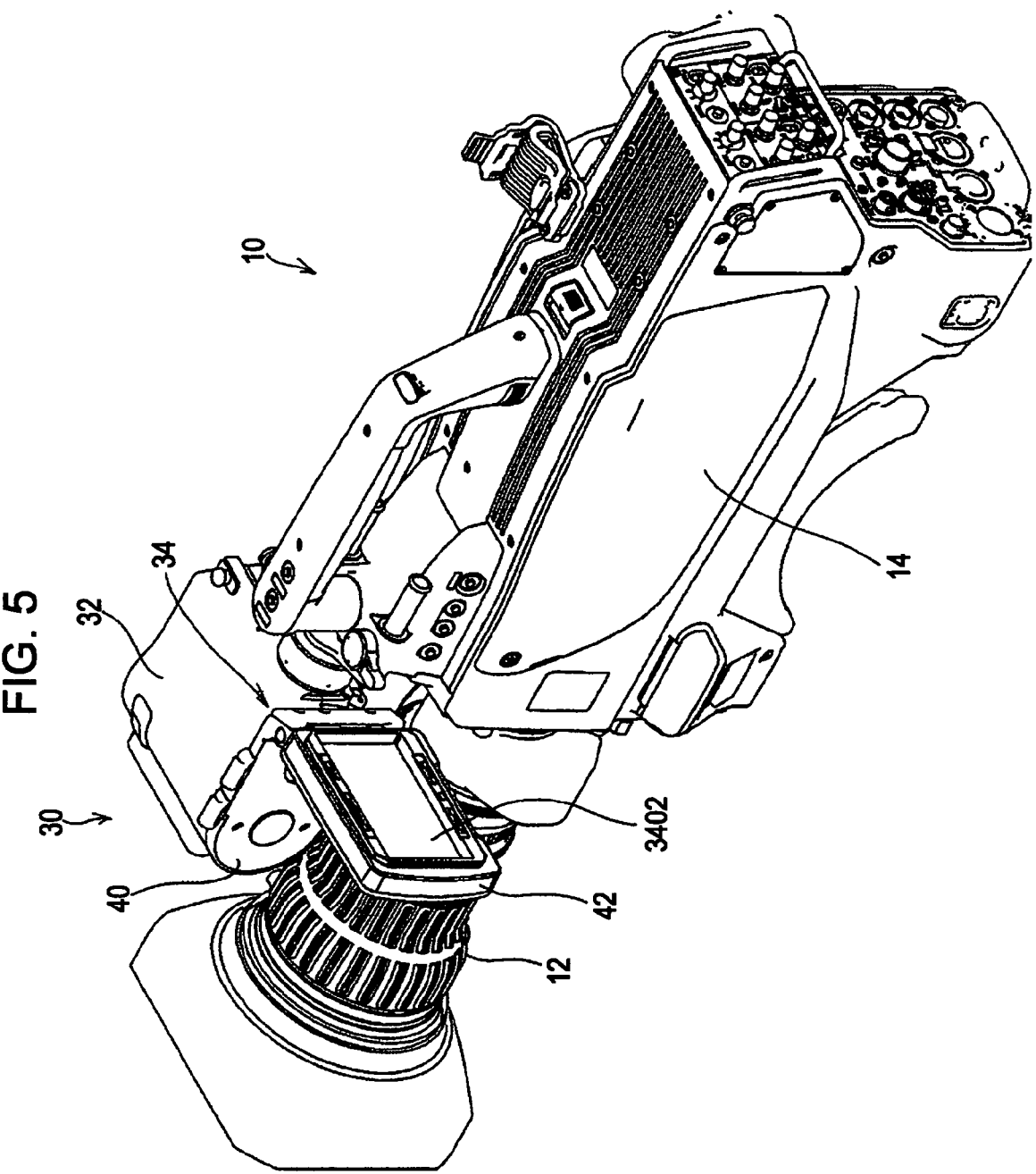
FIG. 5 is a perspective view illustrating the display panel 42 in a standing state in which the eyepiece unit 36 is removed from the viewfinder 30.
Figure 6:
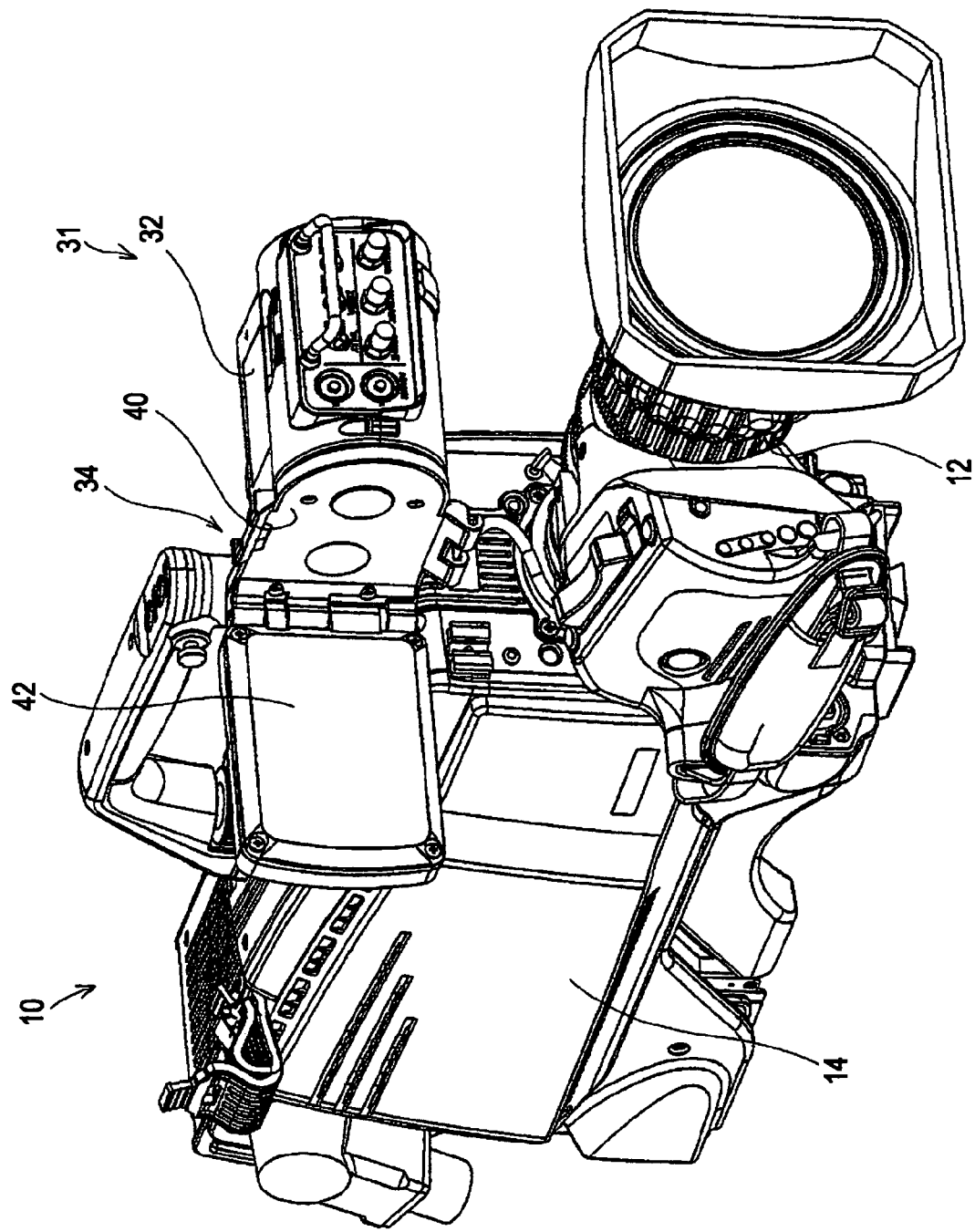
FIG. 6 is a perspective view illustrating a second attached state of a main unit 32 of the viewfinder 30.
Figure 7:
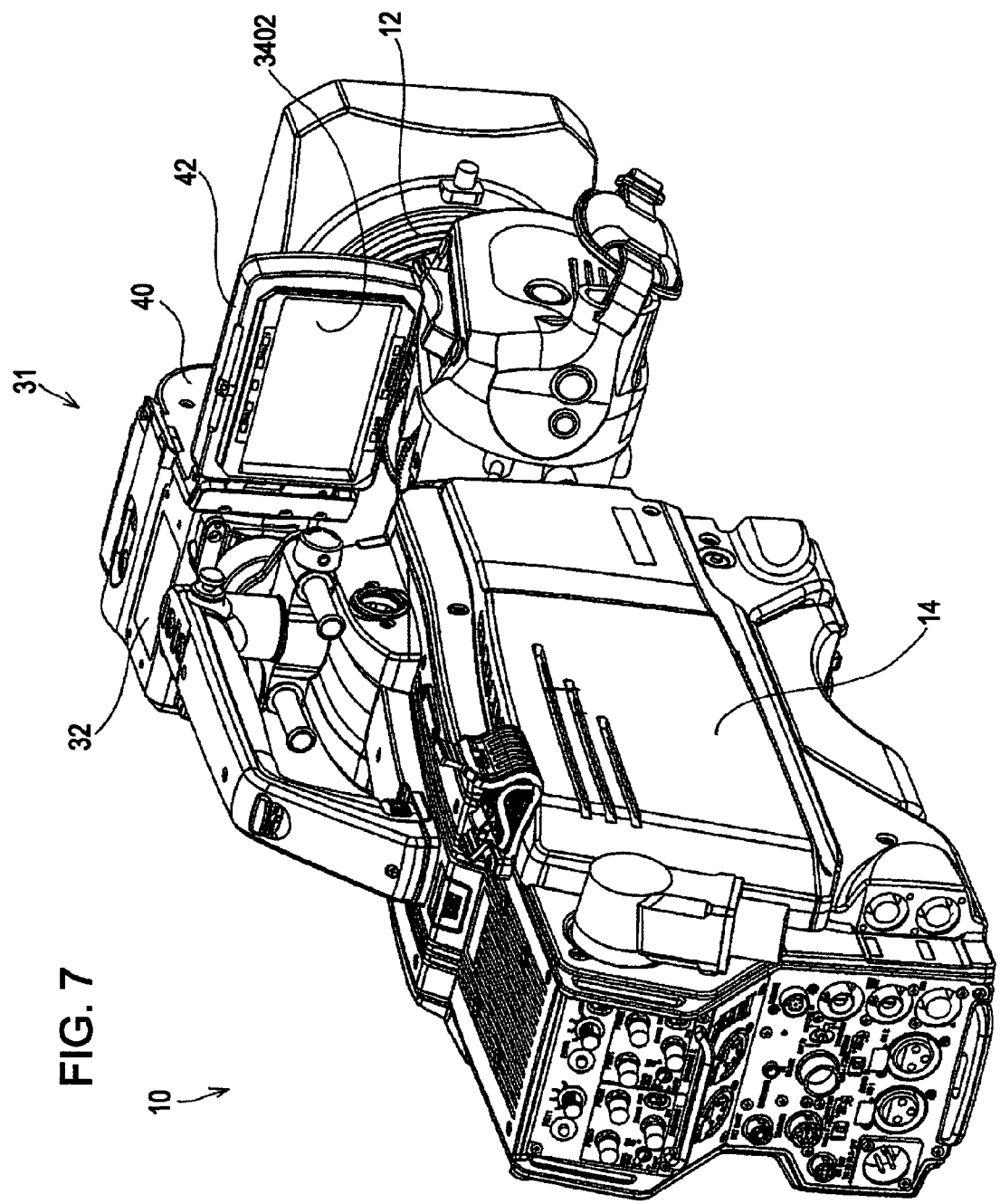
FIG. 7 is a perspective view illustrating the second attached state of the main unit 32 of the viewfinder 30.
Figure 8:
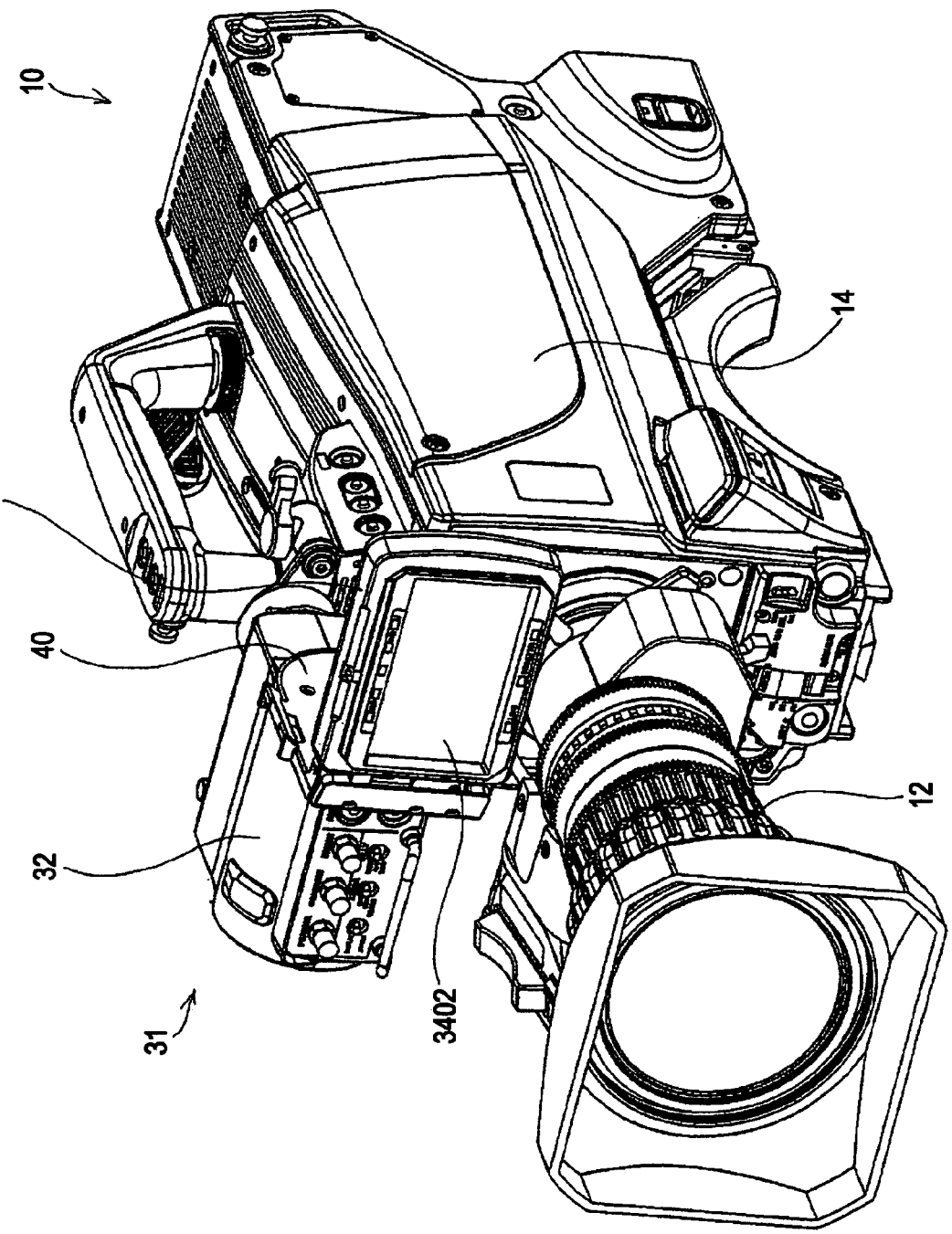
FIG. 8 is a perspective view illustrating a state in which a display portion 34 in a standing state is rotated 180 degrees.
Figure 9:
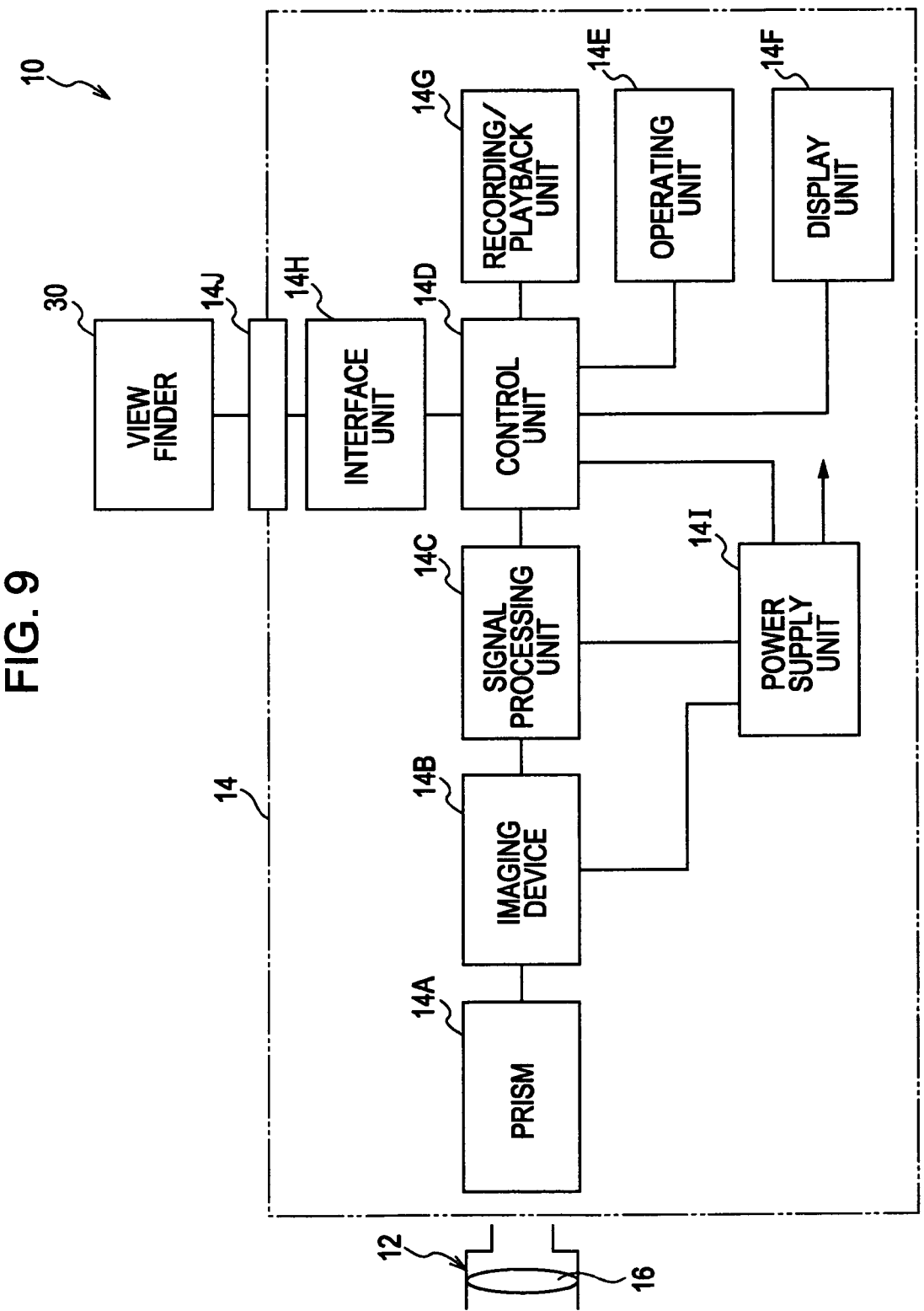
FIG. 9 is a block diagram illustrating the configuration of the imaging apparatus 10.

Next, description will be made regarding embodiments of the present invention with reference to the drawings. FIGS. 1 and 2 are perspective views of an imaging apparatus 10 to which a viewfinder 30 is attached, FIGS. 3 and 4 are perspective views of the imaging apparatus 10, which illustrate a state in which an eyepiece 36 is removed from the viewfinder 30, and a display panel 42 faces the left lateral direction, FIG. 5 is a perspective view illustrating the display panel 42 in a standing state in which the eyepiece unit 36 is removed from the viewfinder 30, FIGS. 6 and 7 are perspective views illustrating a second attached state of a main unit 32 of the viewfinder 30, and FIG. 8 is a perspective view illustrating a state in which a display portion 34 in a standing state is rotated 180 degrees. FIG. 9 is a block diagram illustrating the configuration of the imaging apparatus 10.

With the present embodiment, the imaging apparatus 10 is a commercial video camera employed by a broadcasting station or the like. As shown in FIG. 1, the imaging apparatus 10 includes a camera body 14 extending forward and backward, and a lens barrel 12 is attached to the front portion of the camera body 14.

Note that with the present specification, the left and right are assumed to be a state of viewing the imaging apparatus 10 from the back thereof, the subject side in the optical axis direction of an optical system will be referred to as forward, and the imaging device side thereof will be referred to as backward.

The lens barrel 12 houses a shooting optical system 16. The shooting optical system 16 guides a subject image to an imaging device 14B shown in FIG. 9. Note that as for the imaging device 14B, existing known various types of imaging devices can be employed, such as CCD, C-MOS sensors, and so forth.

As shown in FIG. 1, the camera body 14 includes a casing 18 making up the exterior. The casing 18 includes a front face 18A facing forward, a back face 18B facing backward, left and right side faces 18C and 18D facing left and right lateral directions, an upper face 18E facing upward, and a lower face 18F facing downward.

With the present embodiment, the casing 18 is formed with a height dimension in the vertical direction between the upper face 18E and lower face 18F which is greater than a width dimension in the horizontal direction between the left and right side faces 18C and 18D, and a length dimension in the forward and backward directions between the front face 18A and back face 18B which is greater than the height dimension, and accordingly, the casing 18 exhibits a rectangular parallelepiped shape which is long forward and backward.

As shown in FIG. 2, the front portion of the casing 18 is provided with a camera main unit side attachment portion 19 configured to detachably attach a later-described viewfinder 30, and the back of the camera main unit side attachment portion 19 is provided with a handle for carrying 20. As shown in FIG. 1, the lower face 18D is provided with a shoulder pad 22, which is recessed upward, for carrying the imaging apparatus 10 on the shoulder. The shoulder pad 22 is made up of a member having elasticity and flexibility.

Next, description will be made regarding the viewfinder 30. As shown in FIGS. 2 and 3, the viewfinder 30 is configured so as to include a display unit 31, and an eyepiece unit 36. The display unit 31 is configured so as to include a main unit 32, and a display portion 34. The main unit 32 houses a circuit for operating the display portion 34. The display portion 34 displays a picture on a display surface 3402 based on the picture signals supplied from the camera body 14. The eyepiece unit 36 enlarges and displays a picture displayed on the display surface 3402 of the display portion 34.

With the present embodiment, the display portion 34 is configured so as to include a liquid crystal display device 132 (see FIG. 24) serving as a display device for displaying a picture. Note that the display device is not restricted to the liquid crystal display device, and existing known various types of display devices can be employed, such as an organic EL display device and so forth.

Figure 10:
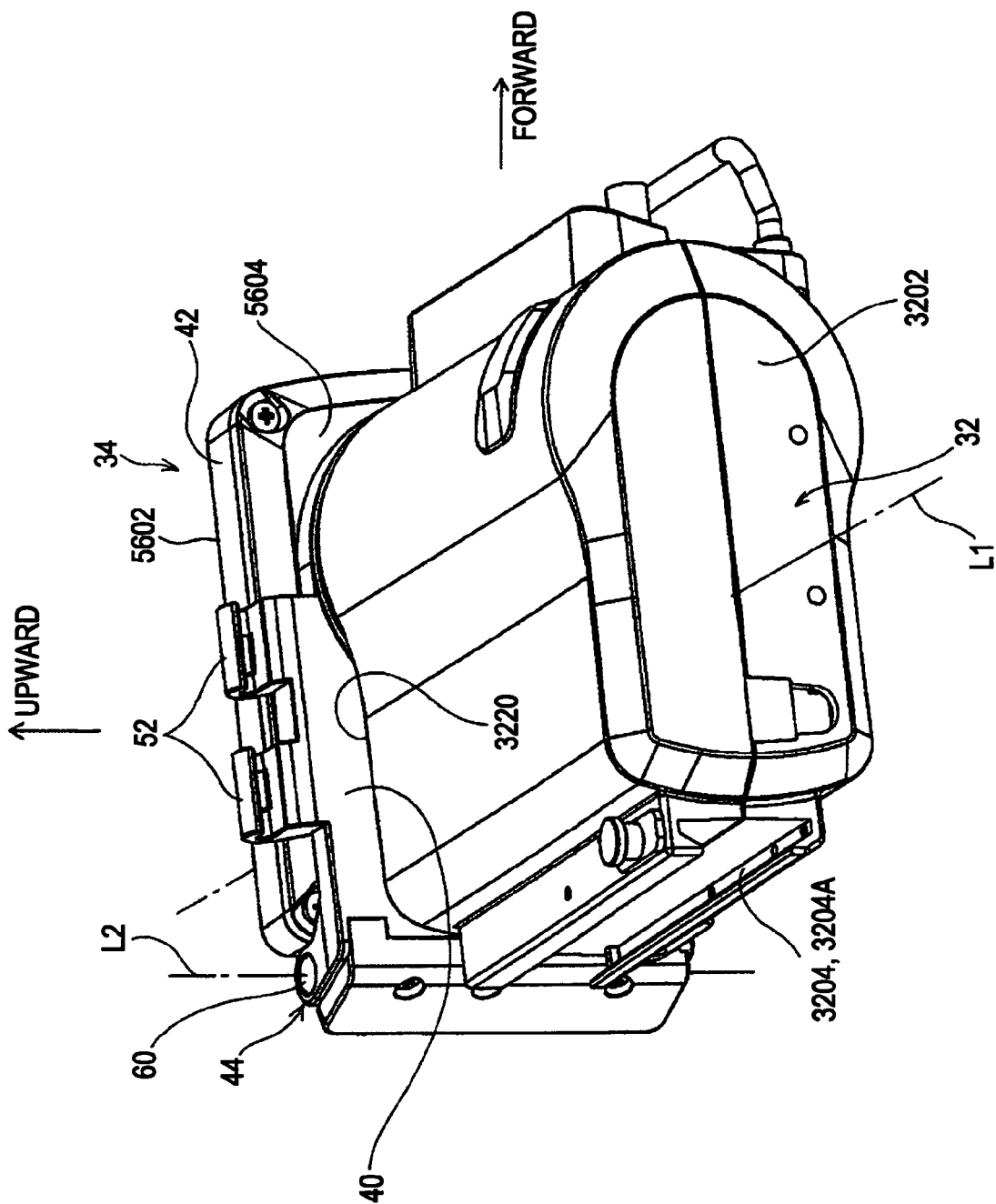
FIG. 10 is a perspective view of the main unit 32 and display portion 34.
Figure 11:
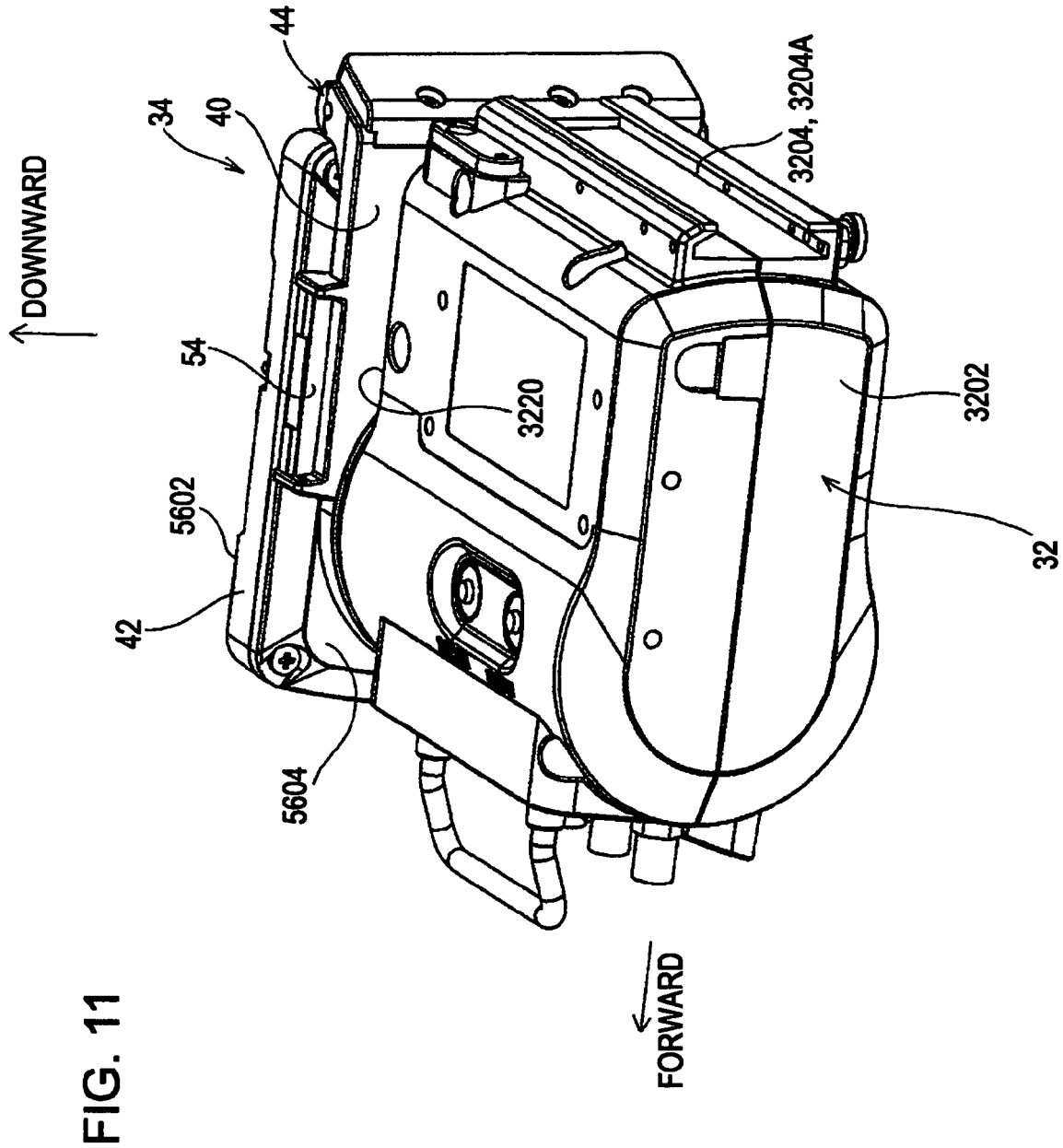
FIG. 11 is a perspective view reversing the upper and lower sides of the main unit 32 and display portion 34.
Figure 12:
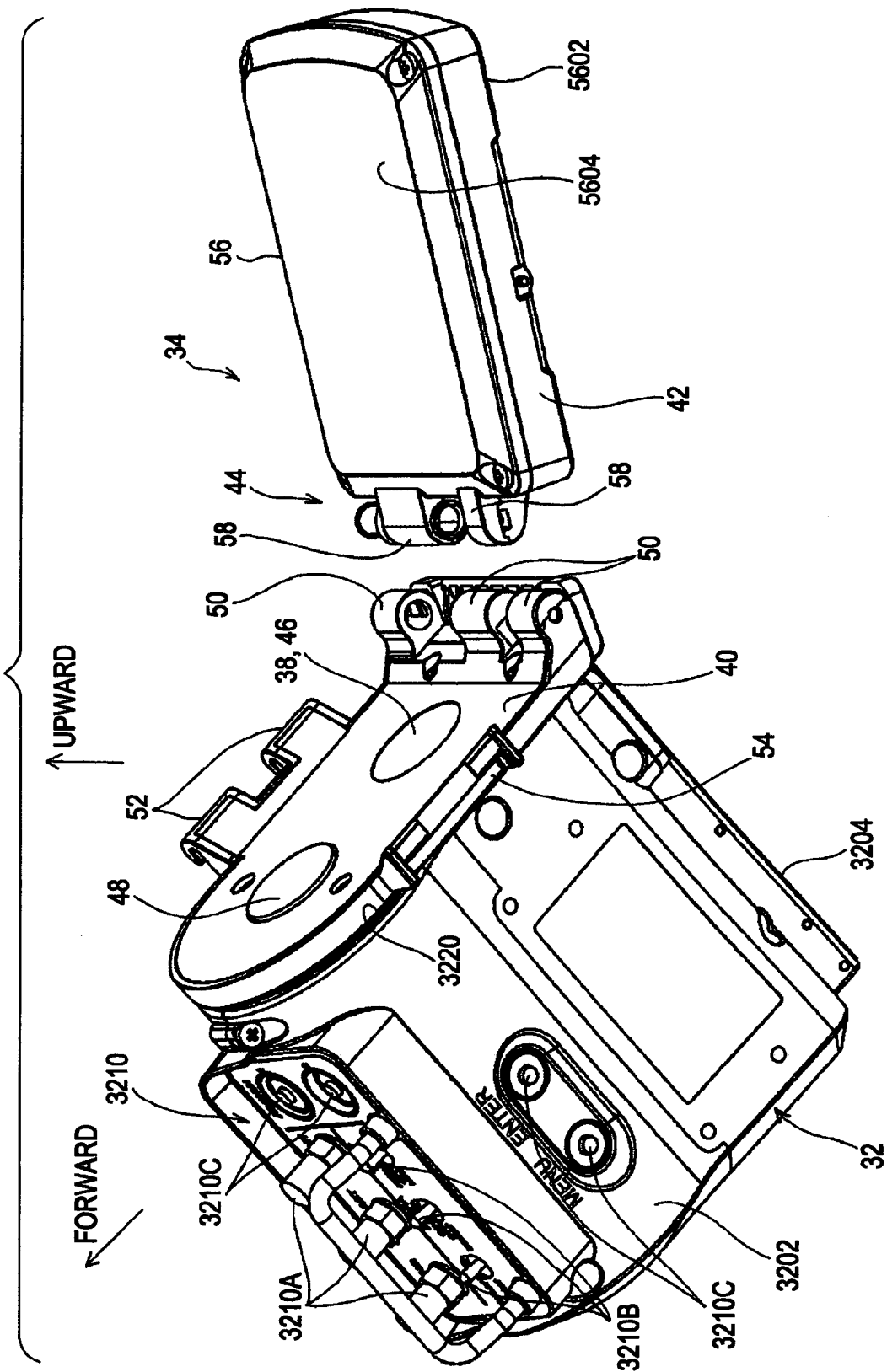
FIG. 12 is an exploded perspective view of the main unit 32 and display portion 34.
Figure 13:
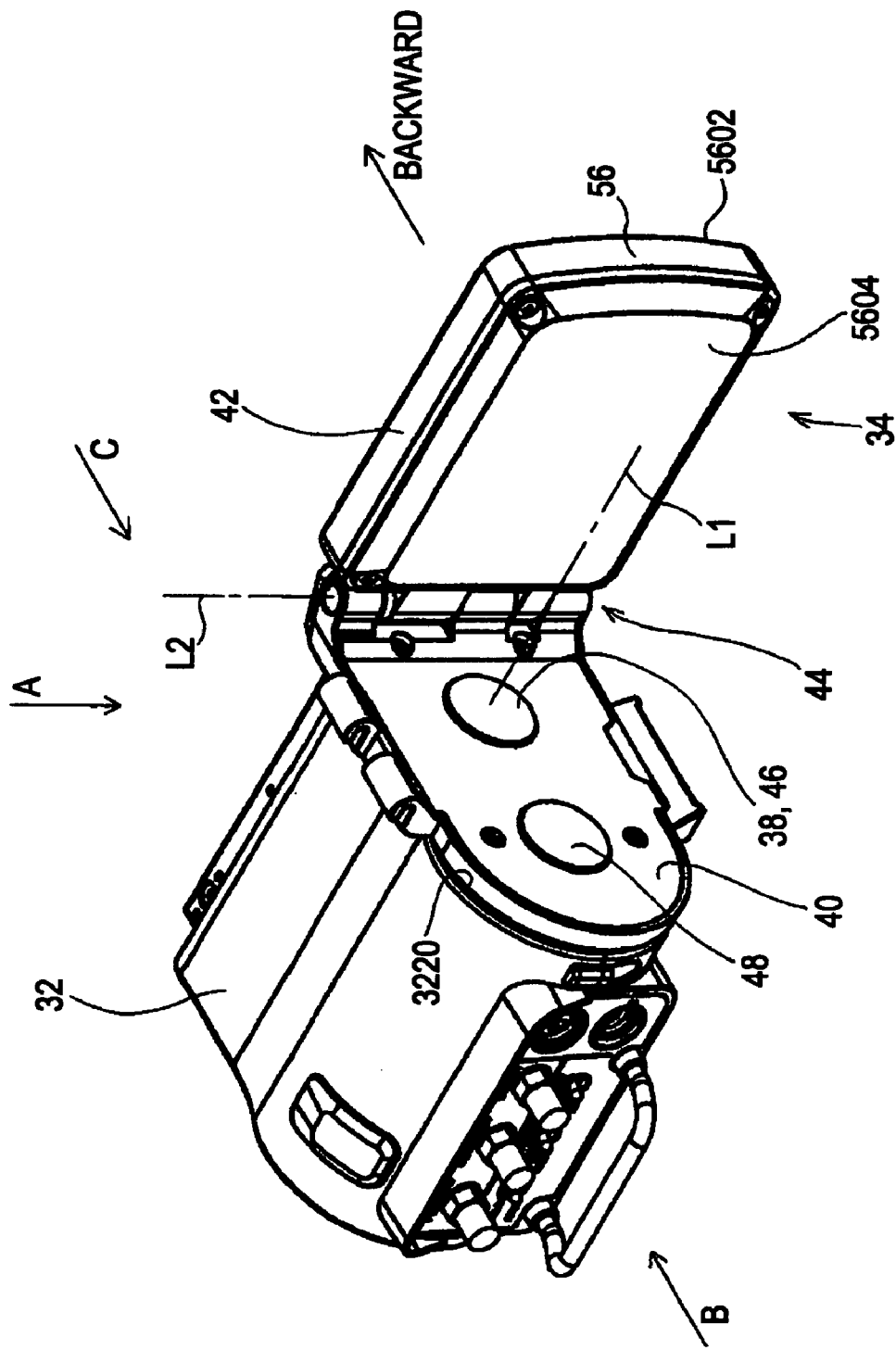
FIG. 13 is a perspective view illustrating a standing state of the display portion 34.
Figure 14A:
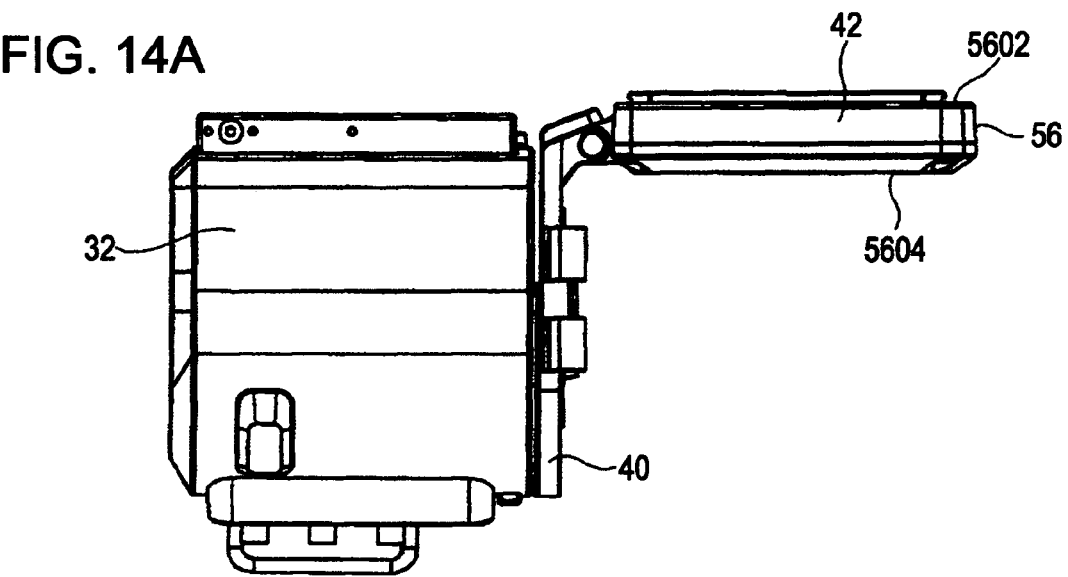
FIG. 14A is a view taken along arrow A in FIG. 13.
Figure 14B:
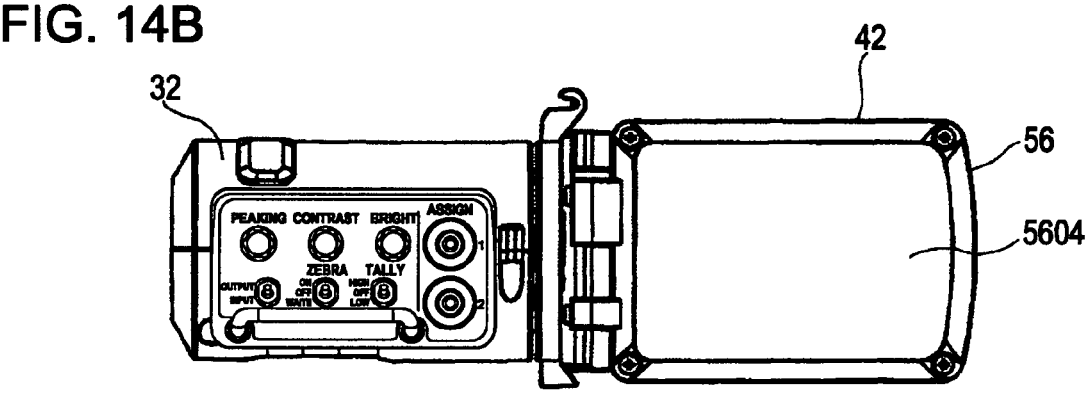
FIG. 14B is a view taken along arrow B in FIG. 13.
Figure 14C:
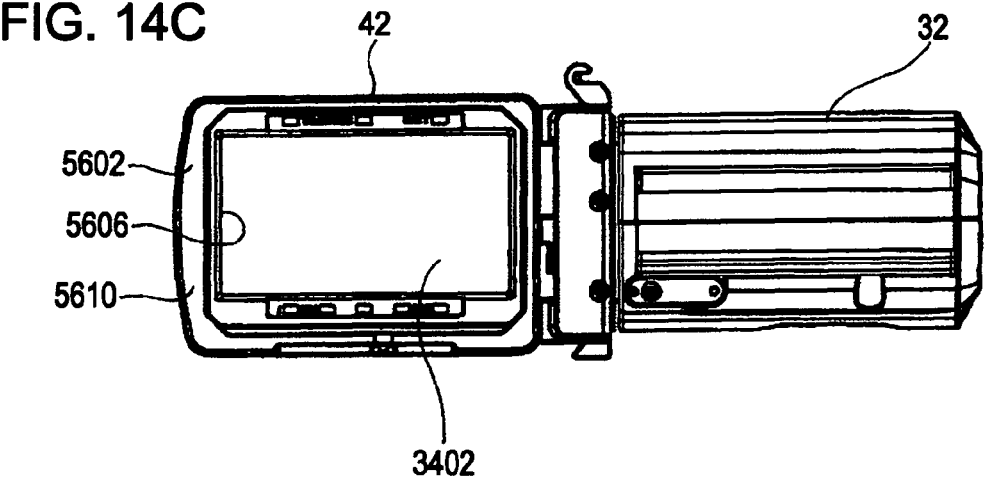
FIG. 14C is a view taken along arrow C in FIG. 13.

FIG. 10 is a perspective view of the main unit 32 and display portion 34, and FIG. 11 is a perspective view reversing the upper and lower sides of the main unit 32 and display portion 34. FIG. 12 is an exploded perspective view of the main unit 32 and display portion 34. FIG. 13 is a perspective view illustrating the standing state of the display portion 34, FIG. 14A is a view taken along arrow A in FIG. 13, FIG. 14B is a view taken along arrow B in FIG. 13, and FIG. 14C is a view taken along arrow C in FIG. 13.

Figure 15:
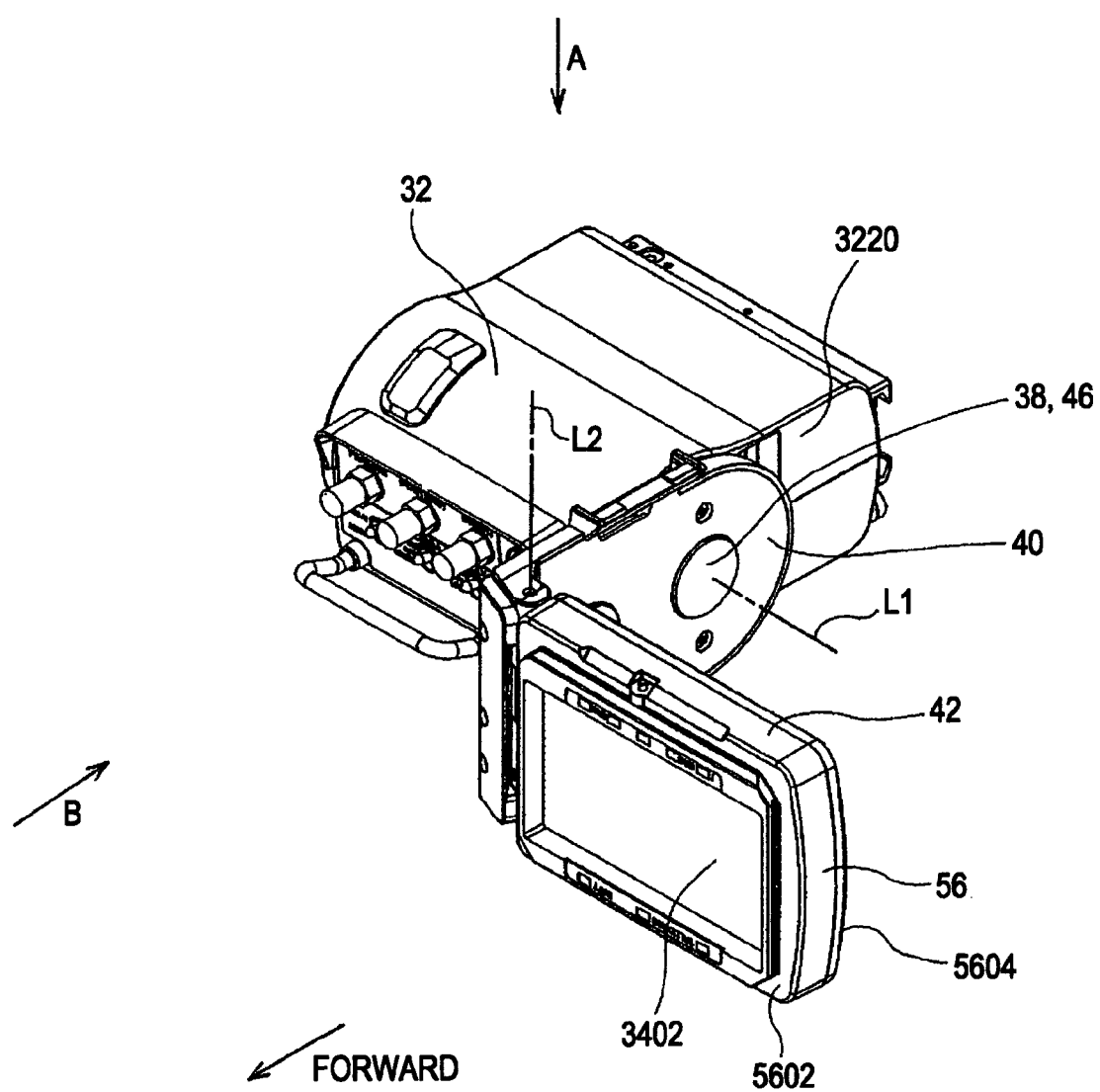
FIG. 15 is a perspective view illustrating a state in which the display portion 34 in a standing state is rotated 180 degrees.
Figure 16A:
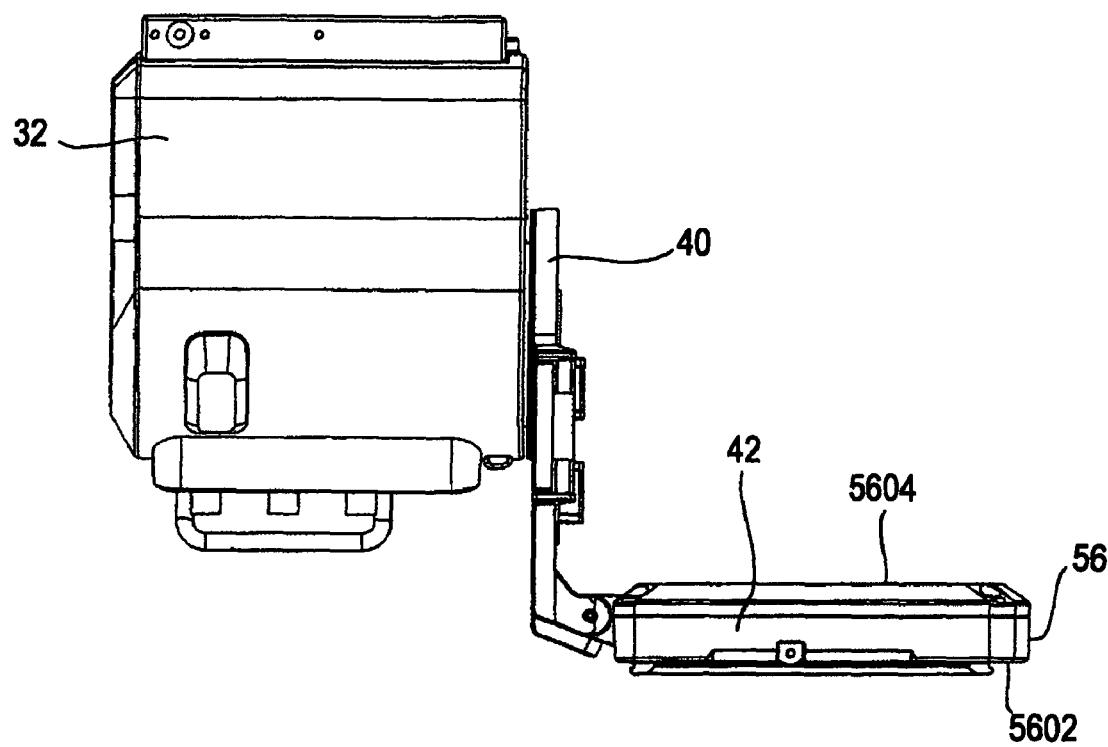
FIG. 16A is a view taken along arrow A in FIG. 15.
Figure 16B:
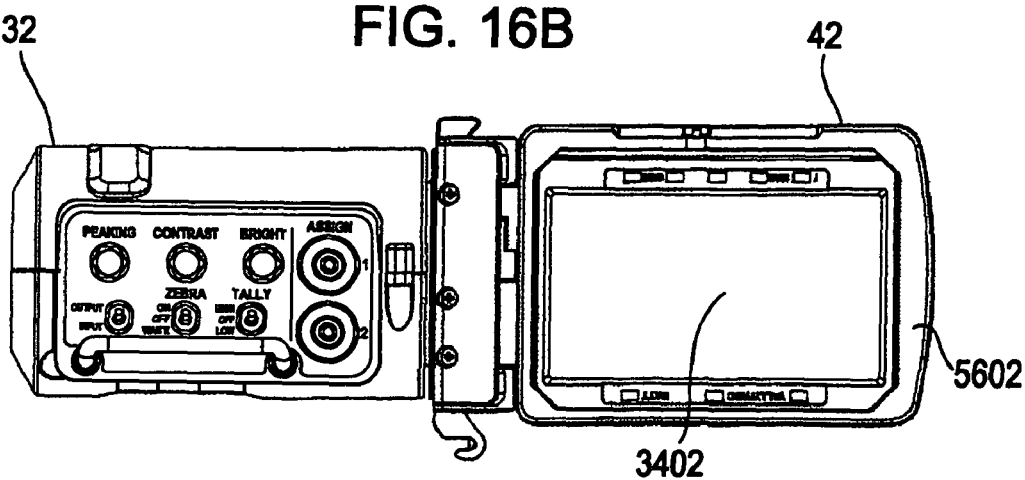
FIG. 16B is a view taken along arrow B in FIG. 15.

FIG. 15 is a perspective view illustrating a state in which the display portion 34 in a standing state is rotated 180 degrees, FIG. 16A is a view taken along arrow A in FIG. 15, and FIG. 16B is a view taken along arrow B in FIG. 15.

As shown in FIGS. 10 and 11, the main unit 32 includes a case 3202. The main unit 32 (case 3202) has the width extending in the horizontal direction of the camera body 14 in a state of being attached to the camera body 14.

One end portion in the width direction of the main unit 32 (case 3202) is formed as a connection face 3220 to which the display portion 34 is connected. The main unit 32 is selectively attached to the camera body 14 in either a first attached state in which the connection face 3220 (supporting member 40) is positioned at the end portion of the main unit 32 in the width direction of the main unit 32 and also in the left lateral direction of the camera body 14 (see FIG. 1 through FIG. 5), or a second attached state in which the connection face 3220 (supporting member 40) is positioned at the end portion of the main unit 32 in the width direction of the main unit 32 and also in the right lateral direction of the camera body 14 (see FIGS. 6 and 7). Attachment/detachment of the main unit 32 to/from the camera body 14 is performed by attaching/detaching a main unit side attachment portion 3204 to/from a camera body side attachment portion 19 (see FIG. 2).

With the present embodiment, the main unit side attachment portion 3204 is configured so as to include a engaging groove 3204A extended and formed in the horizontal direction of the back face positioned backward in a state in which the width direction of the main unit 32 is directed to the horizontal direction of the camera body 14. Note that as for a configuration for attaching/detaching between the main unit side attachment portion 3204 and camera body side attachment portion 19, existing known various types of configurations can be employed.

As shown in FIG. 12, with the present embodiment, in the first attached state, the front face where the case 3202 faces forward, and the lower face where the case 3202 faces downward are provided with an operating member 3210 for allowing a cameraman to operate various types of operations relating to the operation of the display portion 34. The operating member 3210 includes multiple knobs 3210A, multiple changeover switches 3210B, and multiple pushbutton switches 3210C, and so forth.

Also, in a state in which the main unit 32 is attached to the camera body 14, as shown in FIGS. 10 and 11, the face facing left sideward is formed as a connection face 3220 which is connected with the display portion 34.

As shown in FIGS. 10 through 13, the display portion 34 is configured so as to include a supporting member 40, a display panel 42, and a second connecting mechanism 44. The supporting member 40 is connected onto the connection face 3220 of the main unit 32 so as to rotate. Connection of the supporting member 40 to the main unit 32 is performed by a first connecting mechanism 38.

The first connecting mechanism 38 is configured so as to include a supporting shaft 46 supported by the main unit 32 so as to rotate and attached to the supporting member 40. With the first connecting mechanism 38, as shown in FIGS. 13 and 15, the supporting member 40 is configured so as to rotate within a range of at least not less than 180 degrees on the main unit 32 (connection face 3220).

In FIGS. 13 and 15, reference symbol L1 denotes a first imaginary axis which is the rotation center of the supporting member 40, and the first imaginary axis L1 extends in the horizontal direction of the camera body 14 in a state in which the main unit 32 is attached to the camera body 14. Note that with the first connecting mechanism 38, frictional resistance is applied to the supporting shaft 46, and the supporting member 40 is configured so as to be held with a desired swing angle. As for the first connecting mechanism 38, existing known various types of configurations can be employed, such as a mechanism employing this frictional resistance method, a mechanism employing a click mechanism method, or the like.

The supporting member 40 is made up of an elongated-shape plate material with the horizontal width being greater than the vertical height. The face of the supporting member 40 positioned at the opposite side of the connection face 3220 is provided with an elastic member 48. This face of the supporting member 40 is a face facing a back face 5604 of the display panel 42 in a later-described laid state.

The elastic member 48 is made up of, for example, a material having elasticity, such as rubber, urethane foam, or the like, in a thin disc shape, and with the present embodiment, the elastic member 48 is housed in a recessed portion formed on the face of the supporting member 40, and provided so as to protrude from the above-mentioned face.

As shown in FIG. 12, multiple bearing portions 50 are formed in bulb-shaped forms on the end portion in the longitudinal direction of the supporting member 40. Also, as shown in FIGS. 10 and 12, of the both sides in the direction orthogonal to the longitudinal direction of the supporting member 40, one side portion is provided with a arc-shaped bearing wall 52. Also, as shown in FIGS. 11 and 12, of the above-mentioned both sides, the other side portion is provided with a retaining recessed portion 54.

Figure 24:
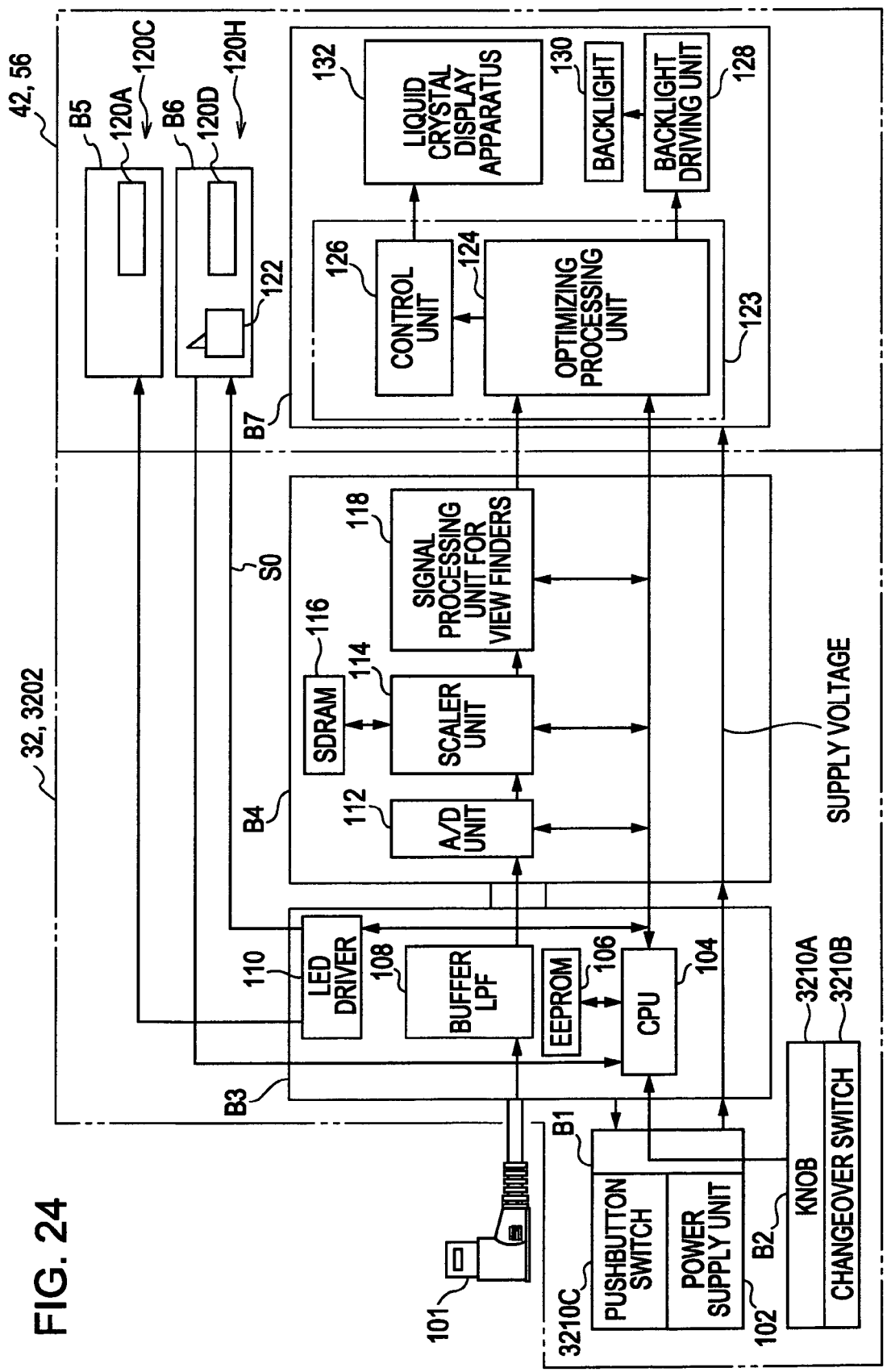
FIG. 24 is a block diagram illustrating the configuration of the control system of the viewfinder 30.

As shown in FIGS. 12 and 13, the display panel 42 includes a rectangular plate-like case 56, and the case 56 houses the liquid crystal display device 132 (see FIG. 24). As shown in FIG. 13 through FIG. 14C, the case 56 includes a front face 5602, and a back face 5604 located at the opposite side of the front face 5602.

The front face 5602 is configured so as to include a front face plate 5610 where an opening 5606 is formed, and the display surface 3402 provided so as to be located in the inside of the opening 5606.

As shown in FIG. 12, a bearing portion 58 to be inserted between the multiple bearing portions 50 is formed in bulb-shaped forms at the short side portion of the case 56. The supporting member 40 and display panel 42 are coupled by the bearing portion 58 being inserted between the bearing portions 50, and by a supporting shaft 60 (see FIG. 10) being inserted between the bearing portions 50 and 58.

Accordingly, with the present embodiment, the second connecting mechanism 44 connects the short side portion of the display panel 42 and the end portion in the longitudinal direction of the supporting member 40, and in a state in which the main unit 32 is attached to the camera body 14, the supporting shaft 60 extends in the vertical direction of the camera body 14.

Also, with the present embodiment, the bearing portions 50, bearing portion 58, supporting shaft 60, and so forth make up the second connecting mechanism 44. This second connecting mechanism 44 is configured so as to hold the display panel 42 with a desired swing angle by frictional resistance being applied to the supporting shaft 60. As for the second connecting mechanism 44, existing known various types of configurations can be employed, such as a mechanism employing this frictional resistance method, a mechanism employing a click mechanism method, or the like.

According to the second connecting mechanism 44, the supporting member 40 and display panel 42 are connected so as to swing with the supporting shaft 60 as the center between a laid state in which the display panel 42 is laid on the supporting member 40 (see FIGS. 3 and 10) and a standing state in which the display panel 42 stands from the supporting member 40 (see FIGS. 5, 13, and 15). Note that in FIGS. 10 and 12, reference symbol L2 denotes the swing center of the display panel 42. As shown in FIG. 10, in a laid state, the back face 5604 faces the supporting member 40, and the front face 5602 is directed outward. Also, in a laid state, the display panel 42 extends on the imaginary plane orthogonal to the first imaginary axis L1.

In a state in which the main unit 32 is attached to the camera body 14 in the first attached state (see FIG. 3), upon the display panel 42 being changed to a laid state, the display surface 3402 of the display panel 42 is directed to the left outward direction of the camera body 14, and as shown in FIG. 5, upon the display panel 42 being changed to a standing state, the display surface 3402 of the display panel 42 is directed backward in the left outward direction of the camera body 14.

In a state in which the main unit 32 is attached to the camera body 14 in the second attached state (see FIG. 6), upon the display panel 42 being changed to a laid state, the display surface 3402 of the display panel 42 is directed to the right outward direction of the camera body 14, and as shown in FIGS. 6 and 7, upon the display panel 42 being changed to a standing state, the display surface 3402 of the display panel 42 is directed backward in the right outward direction of the camera body 14.

Figure 25:
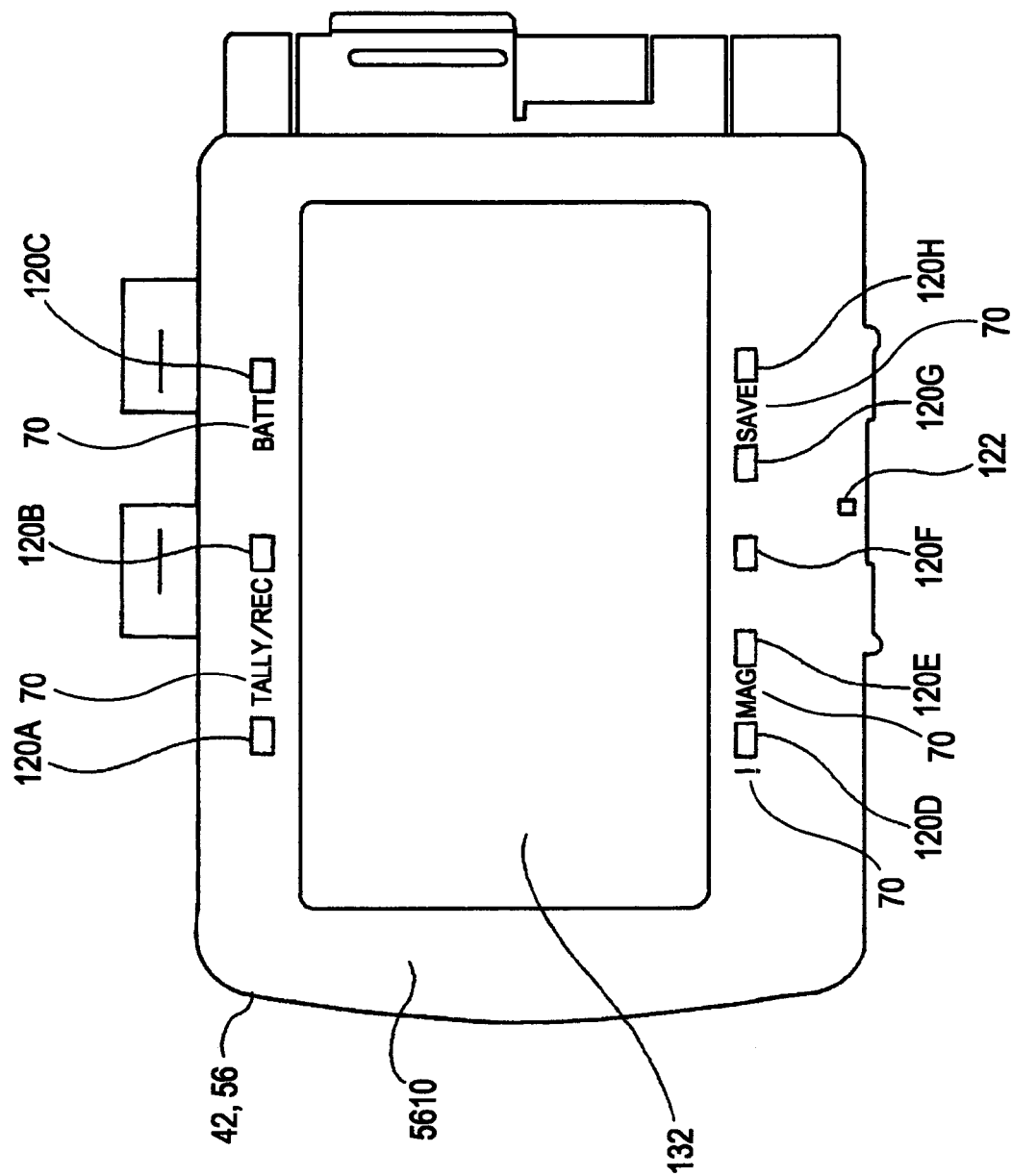
FIG. 25 is a front view of the display panel 42.

As shown in FIG. 25, the front face plate 5610 of the display panel 42 is provided with later-described first through eighth lamps 120A through 120H for displaying the operation status of the imaging apparatus 10 (camera body 14) or display unit 31. That is to say, of the front face plate 5610 of the display panel 42, the side located at one of both sides in the direction orthogonal to the longitudinal direction is provided with the first through third lamps 120A through 120C with intervals along the above-mentioned longitudinal direction.

Also, of the front face plate 5610, the side located at the other of both sides in the direction orthogonal to the longitudinal direction is provided with the remaining fourth through eighth lamps 120D through 120H with intervals along the above-mentioned longitudinal direction.

In other words, the multiple lamps 120A through 120H are disposed with intervals in the horizontal direction of the front face plate 5610 of the display panel 42. That is to say, the multiple numbers of the multiple lamps 120A through 120H are provided in the horizontal direction of the front face plate 5610.

The locations of the front face plate 5610 corresponding to the respective lamps 120A through 120H are each provided with characters or symbols (hereafter, referred to as characters) 70 indicating the function of each of the lamps 120A through 120H by printing or the like.

Figure 17:
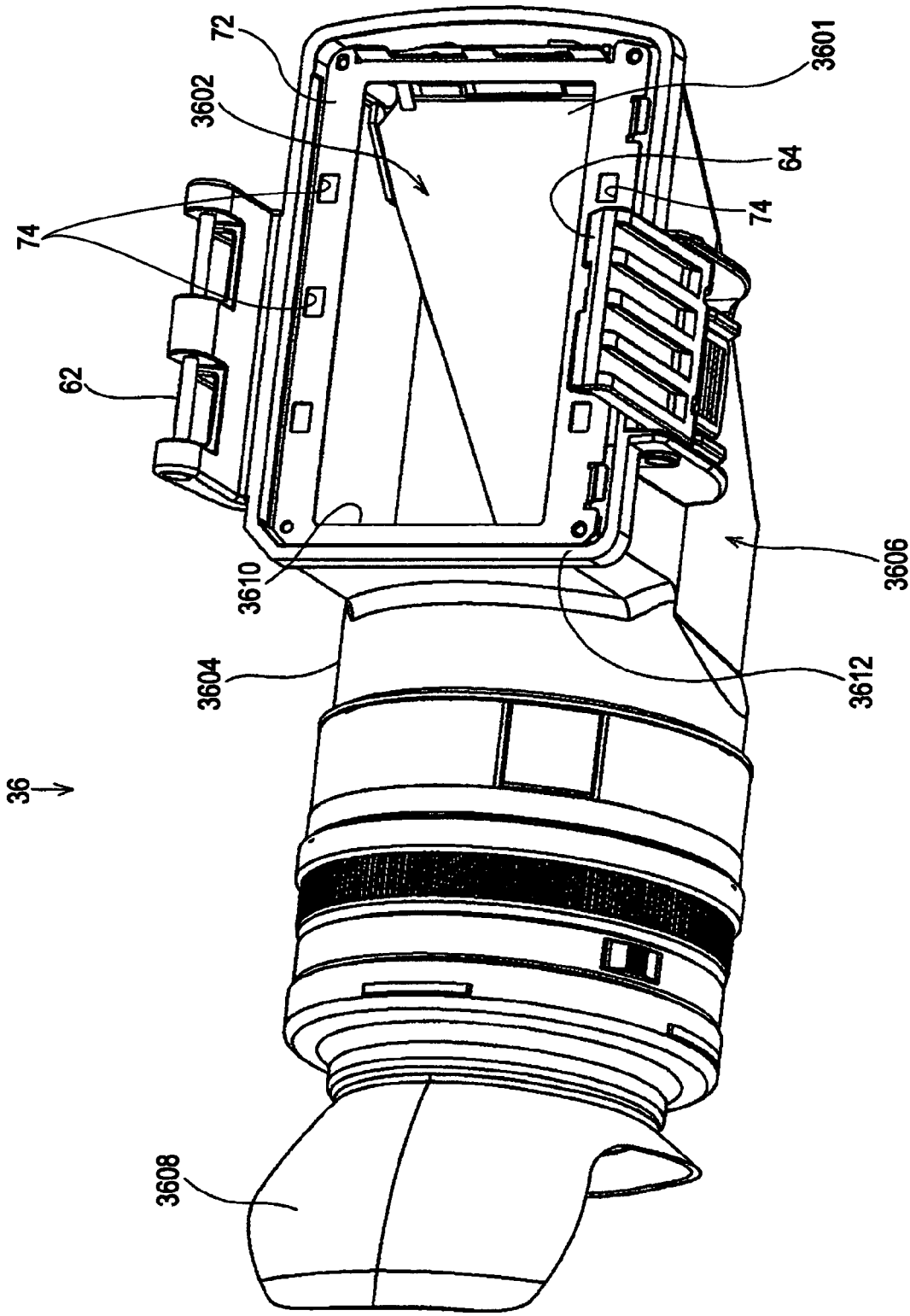
FIG. 17 is a perspective view of the eyepiece unit 36.
Figure 18:
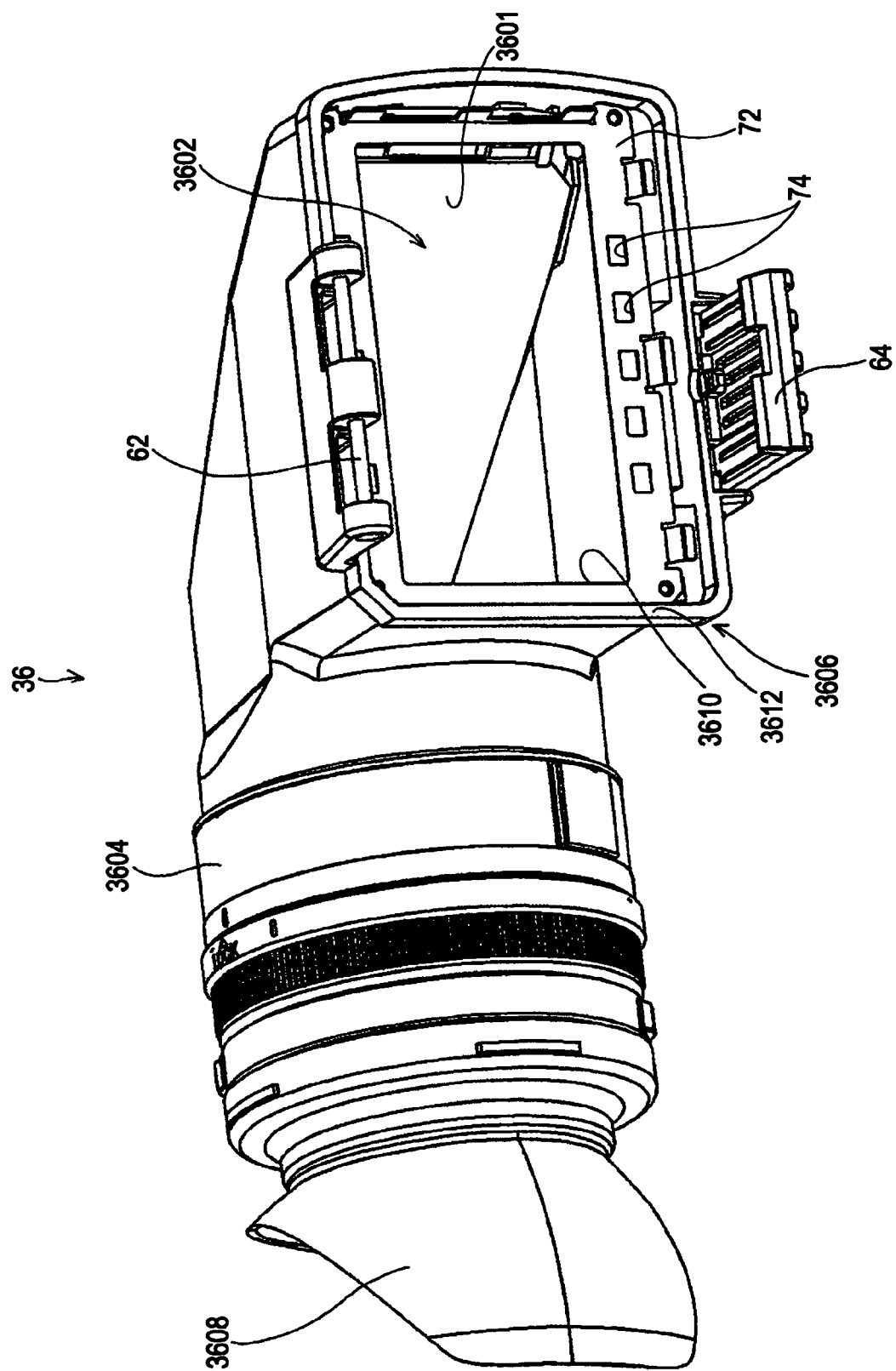
FIG. 18 is a perspective view of the eyepiece unit 36.
Figure 19:
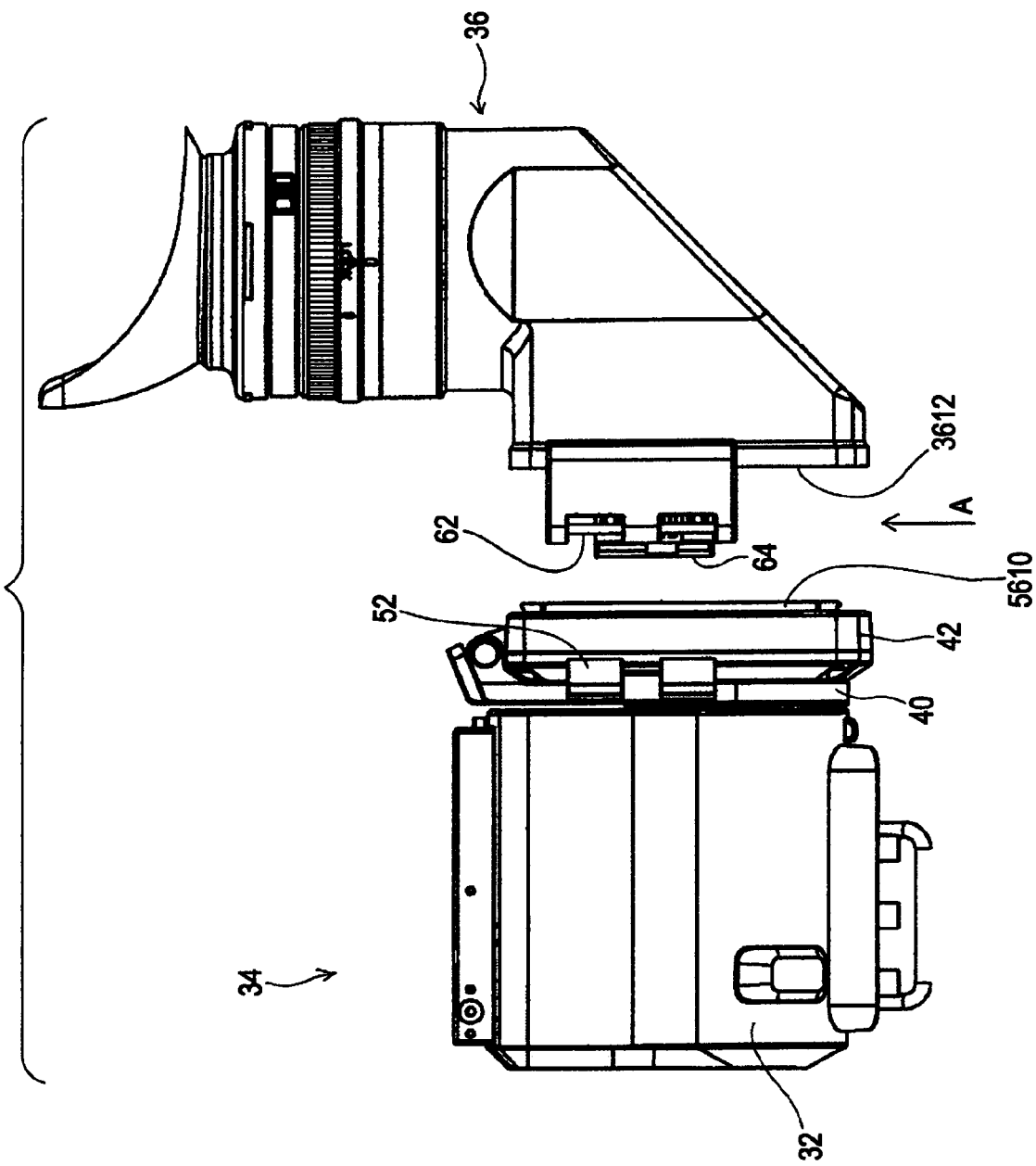
FIG. 19 is a plan view of the main unit 32, display portion 34, and eyepiece 36.
Figure 20:
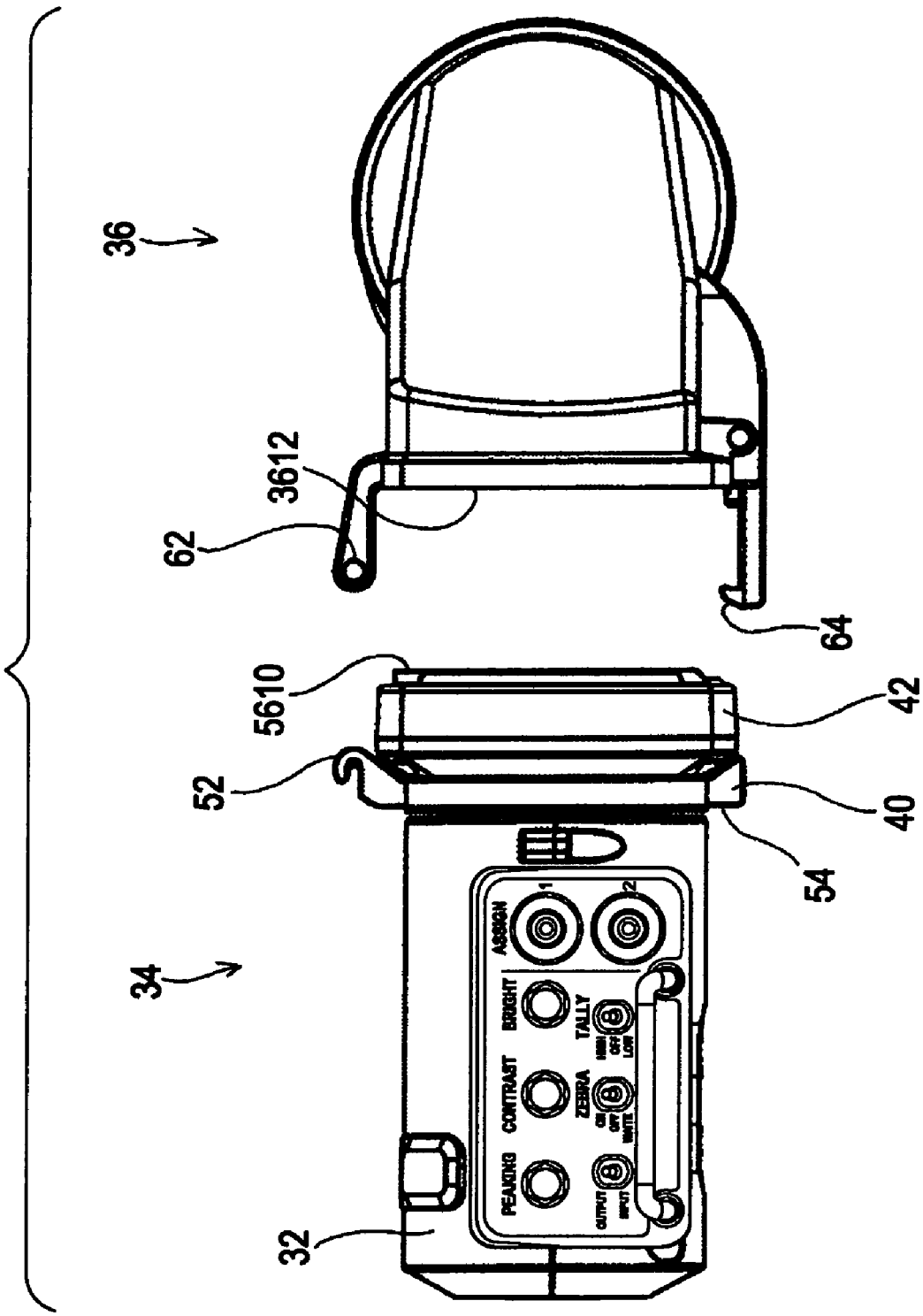
FIG. 20 is a view taken along arrow A in FIG. 19.
Figure 21:
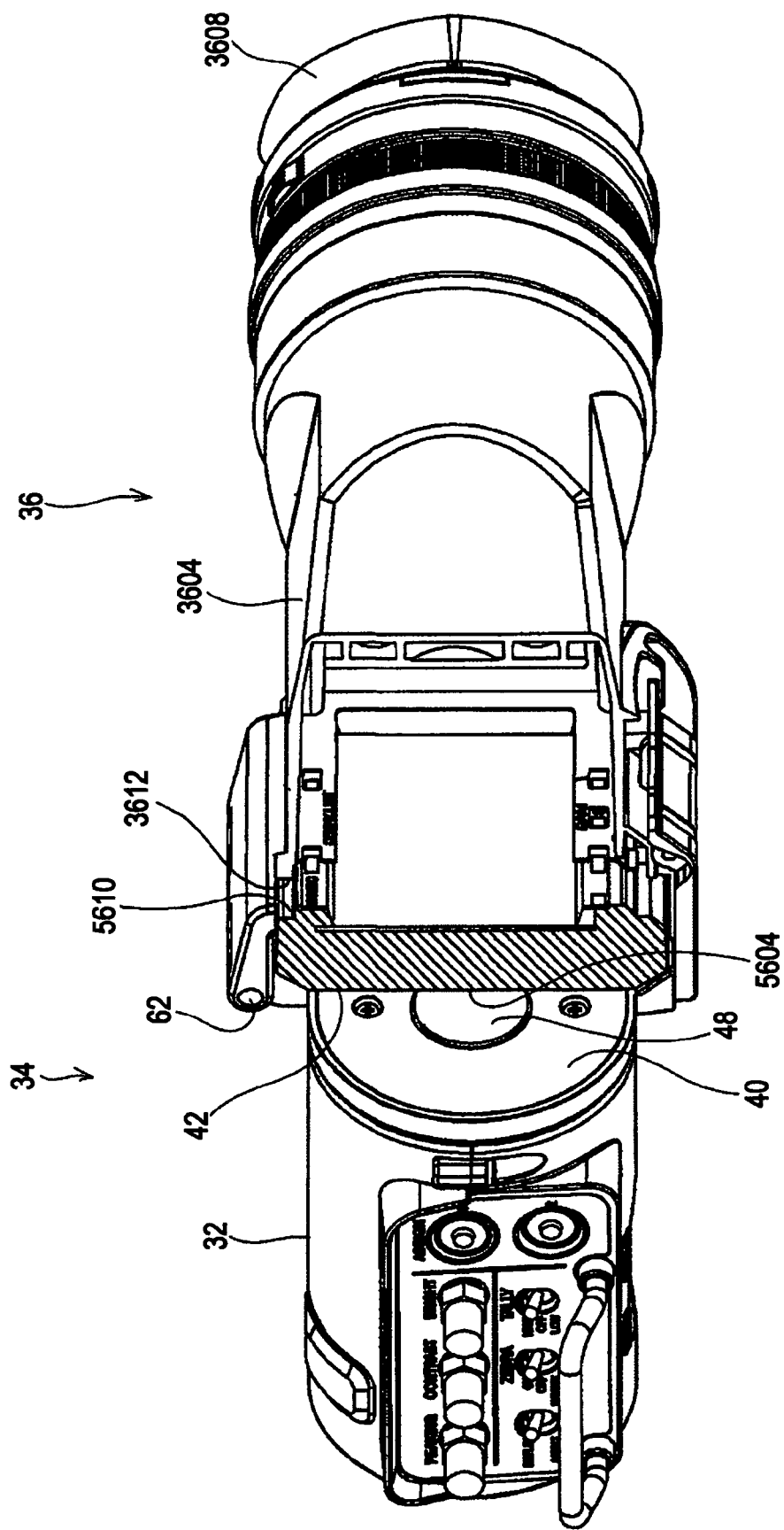
FIG. 21 is an explanatory diagram of an attached state of the eyepiece unit 36.

FIGS. 17 and 18 are perspective views of the eyepiece unit 36, FIG. 19 is a plan view of the main unit 32, display portion 34, and eyepiece unit 36, FIG. 20 is a view taken along arrow A in FIG. 19, and FIG. 21 is an explanatory diagram of the state of attaching the eyepiece unit 36.

As shown in FIGS. 17 and 18, the eyepiece unit 36 is configured so as to include a cylindrical-shaped housing 3604, an eyepiece unit side attachment portion 3606 provided on one end portion in the longitudinal direction of the housing 3604, an eyepiece 3608 provided on the other end portion in the longitudinal direction of the housing 3604, and so forth.

The housing 3604 houses a mirror 3601 for refracting an optical path, and an optical system 3602 made up of multiple lenses for enlarging the picture displayed on the display surface 3402. The eyepiece unit side attachment portion 3606 includes an oblong opening 3610 of which the size corresponds to the display surface 3402.

As shown in FIGS. 17 through 20, a frame portion 3612 capable of pressing the front face plate 5610 of the display panel 42 is extended and formed along the periphery of the opening 3610. Also, a supporting shaft 62 which is attached/detached to/from the bearing wall 52 is provided above the opening 3610, and a retaining pawl 64 which is engaged/unengaged as to a retaining recessed portion 54 is provided below the opening 3610.

As shown in FIG. 21, the attached state of the eyepiece unit 36 to the display portion 34 is, in a laid state, formed by the frame portion 3612 pressing the front face plate 5610, and the elastic member 48 being compressed by the supporting member 40 and the back face 5604 of the display panel 42. In more detail, in a laid state, the supporting shaft 62 is engaged with the bearing wall 52, and the retaining pawl 64 is retained at the retaining recessed portion 54. Thus, the frame portion 3612 presses the front face plate 5610, the elastic member 48 is compressed by the supporting member 40 and the back face 5604 of the display panel 42, thereby forming the attached state of the eyepiece unit 36 to the display portion 34.

That is to say, in the attached state of the eyepiece unit 36, the elastic member 48 is compressed by the supporting member 40 and the back face 5604 of the display panel 42, so that the display panel 42 which swings between a standing state and a laid state is not shaken in the attached state of the eyepiece unit 36, and accordingly, this is advantageous to securing the visual recognition of the display surface 3402 at the time of looking into the eyepiece 3608.

Accordingly, an attaching/detaching mechanism for performing attaching/detaching of the eyepiece unit 36 as to the display portion 34 is made up of the supporting shaft 62, bearing wall 52, retaining pawl 64, and retaining recessed portion 54. Note that as for such an attaching/detaching mechanism, existing known various types of configurations can be employed.

Figure 26:
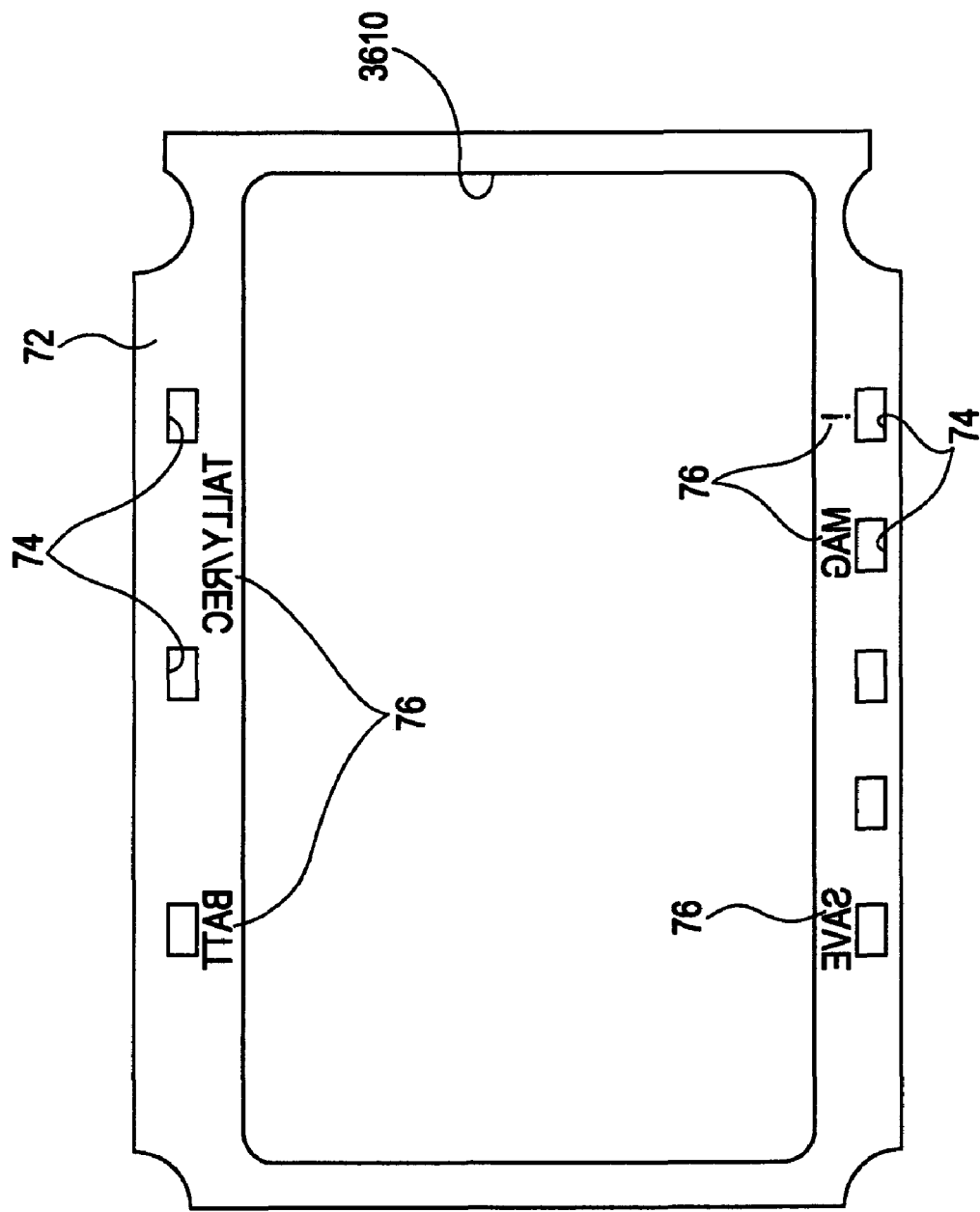
FIG. 26 is a front view of a display plate 72.
Figure 27:
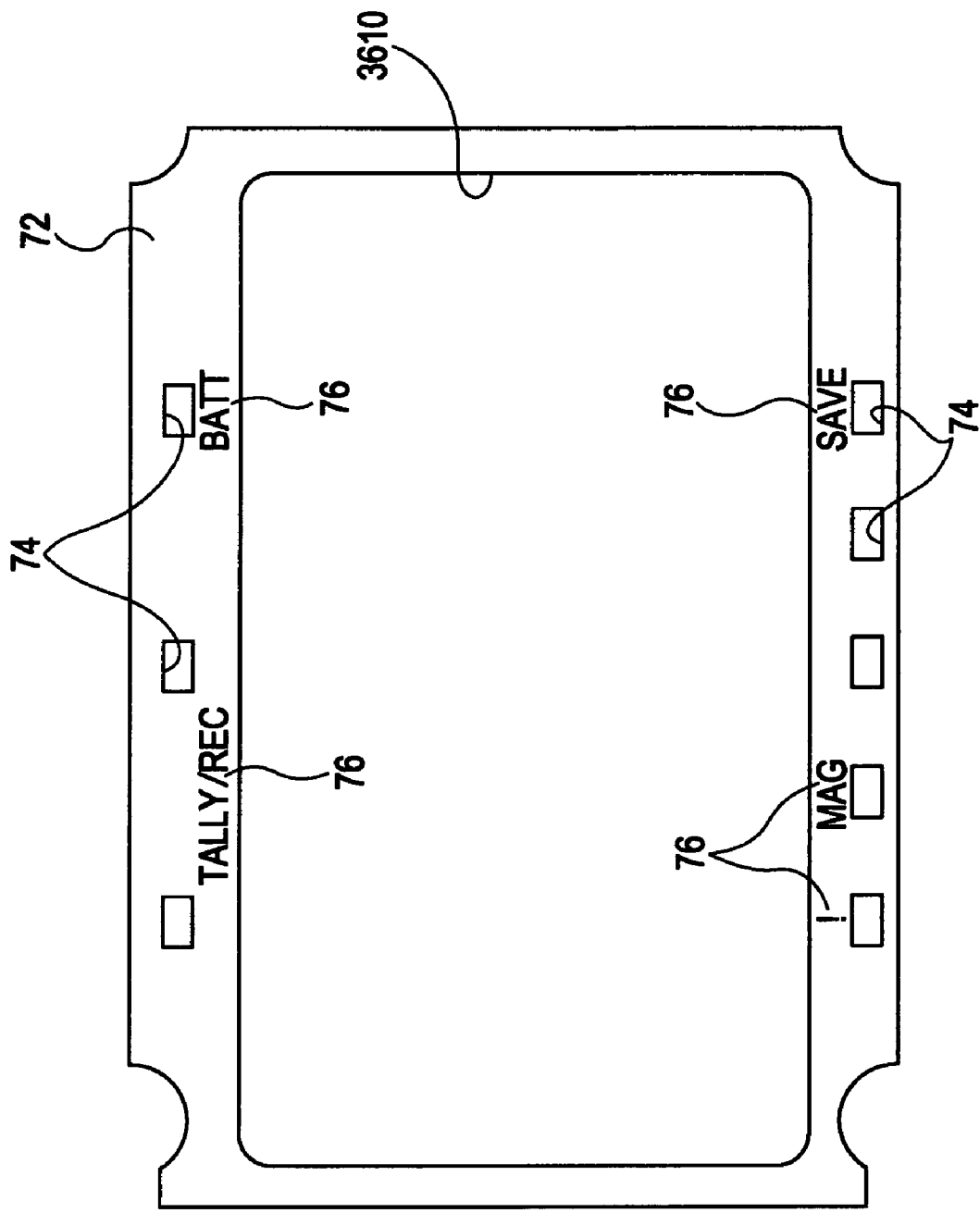
FIG. 27 is an explanatory diagram illustrating a state of viewing the display plate 72 via the viewfinder 30.

As shown in FIGS. 17, 18, and 26, a rectangular frame shaped display board 72 is provided along the inner side of the frame portion 3612. The above-mentioned opening 3610 is formed at the center of the display board 72. In a state of the eyepiece unit 36 being attached to the supporting member 40, with the display board 72, window portions 74 for passing through the light of the respective lamps 120A through 120H are each formed at the locations corresponding to the respective lamps 120A through 120H.

As shown in FIG. 26, characters or symbols (hereafter, referred to as characters) 76 indicating the functions of the respective lamps 120A through 120H are formed with so-called mirror characters where the relation of the left and right positions is reversed at the locations corresponding to the respective window portions 74 on the face at the opposite side of the face where the display board 72 faces the respective lamps 120A through 120H (the face of the display board 72 positioned at the opposite side of the supporting member 40), i.e., the face at the side visually recognized at the time of looking into the eyepiece unit 36 from the eyepiece 3608.

Note that the respective lamps 120A through 120H and the characters 76 are disposed so as to be visually recognized when looking into the eyepiece unit 36 from the eyepiece 3608 in a state of the eyepiece unit 36 being attached to the supporting member 40. Also, the characters 70 of the front face plate 5610 are configured so as to be covered with the display board 72 in a state of the eyepiece unit 36 being attached to the supporting member 40.

According to such a configuration, in the event that the eyepiece unit 36 is not attached to the supporting member 40, the cameraman can visually recognize the characters 70 by directing his/her eyes to the front face plate 5610 of the display panel 42.

Also, in the event of attaching the eyepiece unit 36 to the supporting member 40, and looking into the eyepiece unit 36 from the eyepiece 3608, the characters 76 made up of the mirror characters of the display board 72 are reflected at the mirror 3601 of the eyepiece unit 36, so as shown in FIG. 26, the cameraman can visually recognize the characters 76 as the characters of which the relation between the left and right positions is correct. At this time, the characters 70 of the front face plate 5610 are covered with the display board 72, which prevents the characters 70 horizontally reversed from entering the cameraman's visual field as hindrances.

Figure 22A:
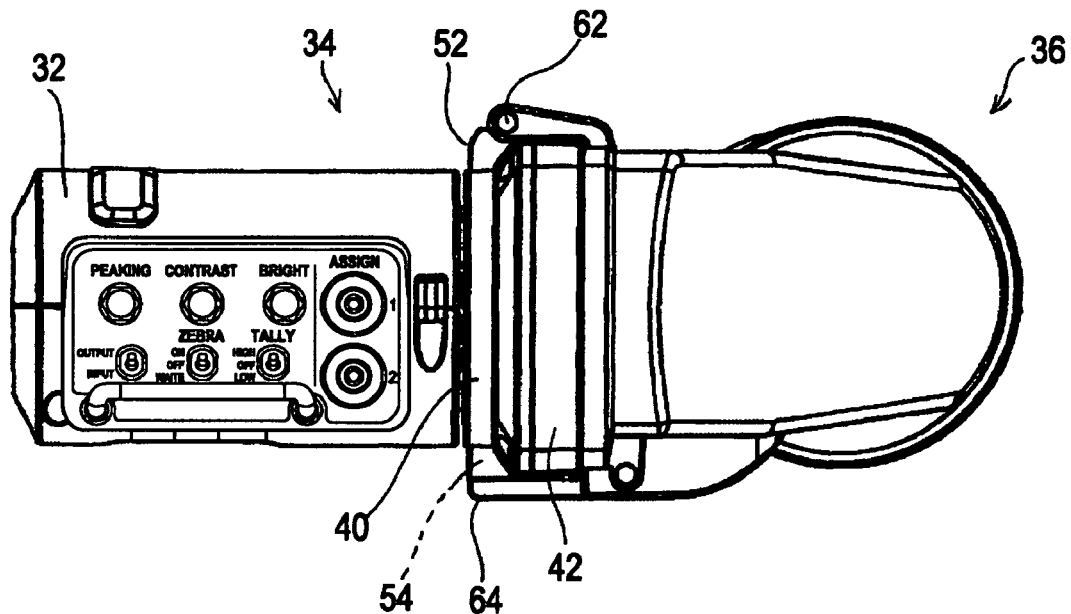
FIGS. 22A and 22B are explanatory diagrams illustrating the time of removing the eyepiece unit 36 from the display portion 34.
Figure 22B:
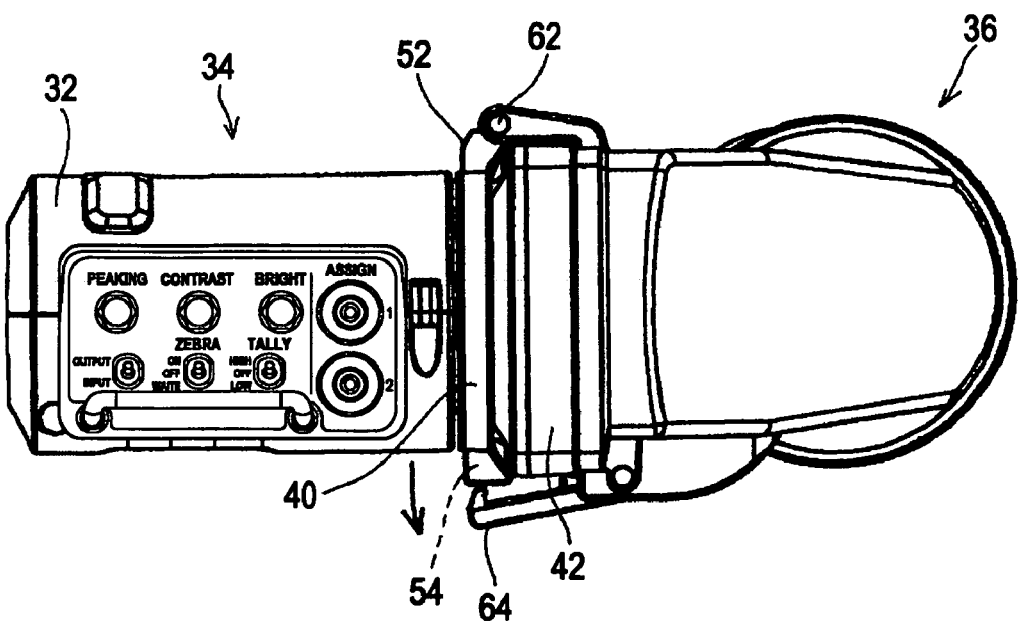

FIGS. 22A through 23B are explanatory diagrams illustrating the time of removing the eyepiece unit 36 from the display portion 34. As shown in FIG. 22A, in a state in which the eyepiece unit 36 is attached to the display portion 34, as shown in FIG. 22B, the retaining pawl 64 is operated in the direction where the retaining pawl 64 is removed from the retaining recessed portion 54.

Figure 23A:
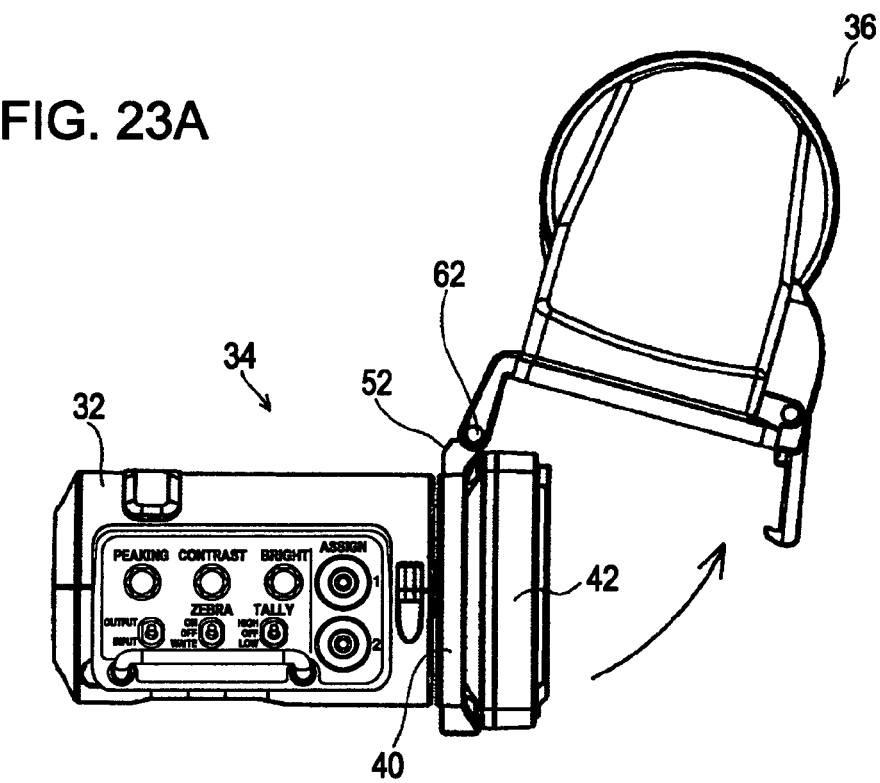
FIGS. 23A and 23B are explanatory diagrams illustrating the time of removing the eyepiece unit 36 from the display portion 34.
Figure 23B:
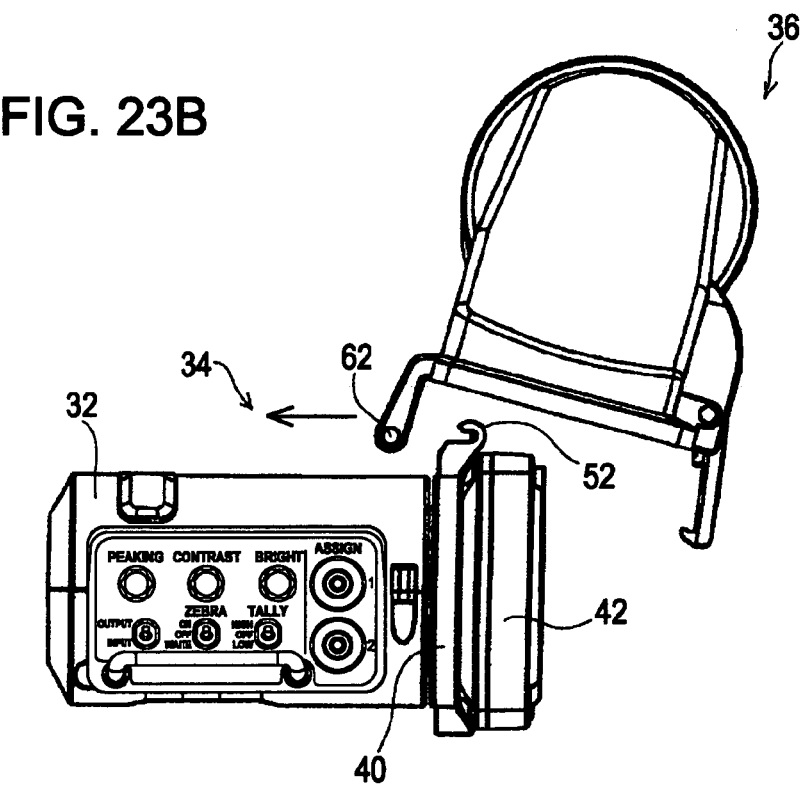

Upon the retaining pawl 64 being removed from the retaining recessed portion 54, as shown in FIG. 23A, the eyepiece unit 36 is moved rotationally with the supporting shaft 62 as a supporting point, and as shown in FIG. 23B, the supporting shaft 62 is removed from the bearing wall 52. Thus, the eyepiece unit 36 is removed from the display portion 34.

Next, description will be made regarding the configuration of the control system of the camera body 14 with reference to FIG. 9. As shown in FIG. 9, the camera body 14 is configured so as to include, in addition to the above-mentioned imaging device 14B, a prism 14A, a signal processing unit 14C, a control unit 14D, an operating unit 14E, a display unit 14F, a recording/playback unit 14G, an interface unit 14H, a power supply unit 14I, and so forth.

With the present embodiment, three imaging devices 14B corresponding to three colors (red, green, and blue) respectively are provided, and the prism 14A separates light flux making up a subject image guided from the shooting optical system 16 into three colors (red, green, and blue), and guides each of these to the imaging device 14B corresponding to each color.

The signal processing unit 14C drives each imaging device 14B, and also subjects the picture signal supplied from each imaging device 14B to a series of preprocessing, such as CDS (Correlated Double Sampling) processing to keep an excellent S/N ratio, and also AGC (Automatic Gain Control) processing to control gain, and further, A/D (Analog/Digital) conversion to generate picture data converted into a digital signal, and so forth, and further, compresses (encodes) the picture data subjected to the preprocessing using a predetermined compression method, thereby generating picture data for recording data. The generated picture data for recording is supplied to the recording/playback unit 14G via the control unit 14D.

Also, the signal processing unit 14C supplies a picture signal which is an analog signal before conversion into a digital signal to the later-described viewfinder 30 via a connector 14J, thereby displaying a picture during shooting on the viewfinder 30. Also, the signal processing unit 14C supplies the picture signal subjected to the above-mentioned preprocessing to an external display apparatus or the like via the connector 14J, thereby displaying a picture during shooting on the external display apparatus or the like.

The recording/playback unit 14G records the picture data for recording supplied from the signal processing unit 14C via the control unit 14D in a recording medium, and also supplies the picture data played from the recording medium to the viewfinder 30 or the external display apparatus via the control unit 14D. As for the recording medium, existing known recording media can be employed, for example, such as a magnetic recording tape, an optical disc, a hard disk, or the like.

The interface unit 14H performs exchange of a picture signal, and exchange of a control signal relating to that exchange between the control unit 14D and viewfinder 30 via the connector 14J. Also, the interface unit 14H supplies a status signal indicating the operation status of the imaging apparatus 10 output from the control unit 14D to the viewfinder 30 via the connector 14J.

Examples of the above-mentioned status signal include a status signal indicating whether or not the current status is a recording status, a status signal warning when the imaging apparatus 10 is driven by battery, that the remaining amount of the battery thereof has fallen below a predetermined value.

The operating unit 14E is made up of switches, knobs, and so forth which are operated to perform various settings relating to the operation of the imaging apparatus 10.

The display unit 14F is made up of a display, LED lamps, and so forth for displaying the operation status of the imaging apparatus 10.

The control unit 14D manages control of the above-mentioned signal processing unit 14C, interface unit 14H, operating unit 14E, display unit 14F, and recording/playback unit 14G.

Specifically, the control unit 14D is made up of a microcomputer including a CPU, RAM providing a working area, ROM storing a control program and so forth, a peripheral LSI for exchanging a control signal or a data signal with the signal processing unit 14C, interface unit 14H, operating unit 14E, and display unit 14F, and executes various types of control operation by the CPU executing the control program in the ROM.

The power supply unit 14I generates power based on the power supplied from an unshown external power source, and supplies the generated power to the imaging devices 14B, signal processing unit 14C, interface unit 14H, operating unit 14E, display unit 14F, and recording/playback unit 14G, thereby operating each unit thereof. Also, the power supplied from the power supply unit 14I is supplied to the viewfinder 30 via the connector 14J, thereby operating the viewfinder 30.

Note that with the present embodiment, the case of the recording/playback unit 14G built in the camera body 14 has been described, but the recording/playback unit 14G may be provided outside of the camera body 14. In this case, what is necessary is to connect the recording/playback unit 14G and camera body 14 with cables, and to perform exchange of a picture signal and so forth via the cables.

Next, description will be made regarding the control system of the viewfinder 30. FIG. 24 is a block diagram illustrating the configuration of the control system of the viewfinder 30, and FIG. 25 is a front view of the display panel 42. As shown in FIG. 24, the control system of the viewfinder 30 is configured so as to include a connector 101 to be connected to the connector 14J of the imaging apparatus, which is provided at the main unit 32, first through fourth boards B1, B2, B3, and B4, and fifth through seventh boards B5, B6, and B7.

The first board B1 is provided with the above-mentioned pushbutton switches 3210C and power supply unit 102. The second board B2 is provided with the above-mentioned knobs 3210A and changeover switches 3210B. The third board B3 is provided with the CPU 104, EEPROM 106, buffer and low-pass filter (LPF) 108, and LED driver 110. The fourth board B4 is provided with the A/D unit 112, scaler unit 114, SDRAM 116, and a signal processing unit 118 for viewfinders. The fifth board B5 is provided with first through third lamps 120A, 120B, and 120C. The sixth board B6 is provided with fourth through eighth lamps 120D, 120E, 120F, 120G, and 120H, and detecting unit 122. The seventh board B7 is provided with a display device driving unit 123, backlight driving unit 128, backlight 130, and liquid crystal display device 132.

The power supply unit 102 regulates the power supplied from the imaging apparatus 10 via the connector 101, and supplies this to the third, fourth, and seventh boards B3, B4, and B7 as power voltage for operation. In other words, the power supply unit 102 makes up the power supply unit of the display device driving unit 123 along with the signal processing unit 118 for viewfinders.

The CPU 104 is operated by the control program stored in an unshown ROM or the like being executed, which controls the operations of the A/D unit 112, scaler unit 114, signal processing unit 118 for viewfinders, display device driving unit 123, and so forth. Also, the CPU 104 performs various types of operation in response to operating input of the knobs 3210A, changeover switches 3210B, and pushbutton switches 3210C. These operations include the display operations and setting operations of a later-described setting menu screen.

Also, the CPU 104 controls the operation of the LED driver 110 based on a status signal indicating the operation status of the imaging apparatus 10 supplied from the imaging apparatus 10 via the connector 101 (e.g., a status signal indicating whether or not the current state is a recording sate, or a status signal warning the remaining amount of the battery), and the operation status of the display unit 31.

Also, the CPU 104 controls the operation of the LED driver 110 based on the detection signal supplied from the detecting unit 122 as described later to adjust the brightness of the first through eighth lamps 120A through 120H, or controls the operation of the backlight driving unit 128 to adjust the brightness of a picture to be displayed on the display surface 3402 of the liquid crystal device 132.

Also, the CPU 104 is configured so as to reverse the relation between the turned-on and turned-off positions in the horizontal direction of the first through eighth lamps 120A through 120H by controlling the operation of the LED driver 110 based on the detection signal supplied from the detecting unit 122 as described later (so as to interchange in the horizontal direction). With the present embodiment, the CPU 104 and LED driver 110 make up a lamp control unit which realizes a feature of the present invention.

The EEPROM 106 stores various types of data necessary for the operation of the CPU 104, e.g., later-described first and second brightness, and third and fourth brightness.

The buffer and low-pass filter (LPF) 108 accumulates the picture signals (hereafter, referred to as first picture signals) supplied from the camera body 14 of the imaging apparatus 10 via the connector 101, and provides the first picture signals of a necessary frequency band to the A/D unit 112 at the subsequent stage.

The LED driver 110 supplies a drive current to the first through eighth lamps 120A through 120H, thereby turning on/off these lamps. Also, the LED driver 110 is configured so as to adjust the brightness of the first through eighth lamps 120A through 120H by increasing/decreasing the drive current based on the control signal supplied from the CPU 104.

With the present embodiment, the LED driver 110 controls the drive current by PWM (Pulse Width Modulation) control.

The A/D unit 112 converts the first picture signal supplied from the buffer and low-pass filter 108 from an analog signal to a digital signal. The scaler unit 114 subjects the first picture signal which is a digital signal supplied from the A/D unit 112 to scaling (lowering resolution) in accordance with the number of pixels of the liquid crystal display device 132. The SDRAM 116 is employed when the scaler unit 114 subjects the first picture signals to scaling. The signal processing unit 118 for viewfinders subjects the first picture signal supplied from the scaler unit 114 to existing known various types of signal processing to generate a second picture signal, and supplies this second picture signal to the display device driving unit 123 at the subsequent stage.

Examples of such signal processing include peaking processing for enhancing and displaying the outline portion of a picture, and enlargement display processing for enlarging and displaying a part of a picture.

Also, the signal processing unit 118 for viewfinders includes a function for performing the signal processing of the first picture signals such that a picture to be displayed on the display surface 3402 of the liquid crystal display device 132 turns to a state of being rotated 180 degrees with the imaginary axis passing through the center of the display surface 3402 orthogonal to the display surface 3402 as the center, i.e., rotation processing, and a function for performing the signal processing of the first picture signals so as to laterally invert a picture to be displayed on the display surface 3402 of the liquid crystal display device 132, i.e., mirror reversal processing. Note hereafter that processing for performing one or both of such rotation processing and mirror reversal processing will be referred to as picture reversal processing.

Specifically, a picture to be displayed on the display surface 3402 is vertically inverted by the rotation processing being performed, and a picture to be displayed on the display surface 3402 becomes a mirror image by the mirror reversal processing being performed.

Execution/non-execution of such rotation processing, and execution/non-execution of such mirror reversal processing are arranged to be controlled by the CPU 104 in response to the operations of the operating member 3210.

That is to say, with the present embodiment, the CPU 104 and signal processing unit 118 for viewfinders make up a picture control unit for controlling the display operation of a picture as to the display surface 3402 of the display panel 42.

The display device driving unit 123 is configured so as to include an optimization processing unit 124 (second signal processing unit) and a control unit 126. The optimization processing unit 124 subjects the picture signal supplied from the signal processing unit 118 for viewfinders to optimization signal processing necessary for displaying a picture at the liquid crystal display device 132.

With the present embodiment, the signal processing units 118 for viewfinders and optimization processing unit 124 are each made up of a PLD (Programmable Logic Device). The control unit 126 generates a driving signal for driving the liquid crystal display device 132 based on the optimized second picture signal supplied from the optimization processing unit 124, and performs processing such as supplying the generated signal to the liquid crystal display device 132.

The liquid crystal display device 132 displays a picture based on the above-mentioned driving signal, and with the present embodiment, displays a picture with brightness according to the light amount of the illumination light irradiated from the backlight 130 provided on the back face of the liquid crystal display device 132.

The backlight driving unit 128 turns on the backlight 130 by supplying a driving signal to the backlight 130, and is configured to adjust the brightness of illumination light of the backlight 130 based on the control signal supplied from the CPU 104, and thus adjust the brightness of a picture to be displayed on the display surface 3402.

As shown in FIG. 25, the first lamp 120A is a tally lamp which can be used by the cameraman assigning an arbitrary function thereto. The second lamp 120B and sixth lamp 120F are tally lamps indicating that recording by the imaging apparatus 10 is being performed by turning on these lamps. The third lamp 120C is a battery remaining quantity indicator for warning by turning on this lamp when the imaging apparatus 10 is driven by the battery, that the remaining amount of the battery thereof has fallen below a predetermined value. The fourth, fifth, seventh, and eighth lamps 120D, 120E, 120G, and 120H are lamps for displaying whether or not to perform the above-mentioned peaking processing, the operation status of the display unit 31 including whether or not to perform the enlargement display processing, and so forth.

The detecting unit 122 detects the presence/absence of attachment of the eyepiece unit 36 to the display portion 34 (whether the current state is an attached state or a detached state), and supplies a detection signal S0 to the CPU 104. With the present embodiment, an eyepiece unit detecting unit which realizes a feature of the present invention is made up of the detecting unit 122.

As shown in FIG. 25, with the present embodiment, the detecting unit 122 is provided at the front face plate 5610 of the case 56 pressed by the frame portion 3612 of the eyepiece unit 36. A switch is employed as such a detecting unit 122 which is turned on when being pressed by the frame portion 3612, and is turned off when pressing is released. Note that as for such a detecting unit 122, existing known various types of switches, sensors, and so forth can be employed.

Accordingly, in a state in which the eyepiece unit 36 is attached to the display portion 34, the detection signal S0 in an ON state is supplied from the detecting unit 122 to the CPU 104, and in a state in which the eyepiece unit 36 is removed from the display portion 34, the detection signal S0 in an OFF state is supplied from the detecting unit 122 to the CPU 104.

Next, description will be made regarding the brightness setting of the liquid crystal display device 132, and the brightness settings of the first through eighth lamps 120A through 120H.

As described above, with the viewfinder 30, there are two use modes of the case of attaching the eyepiece unit 36 to the display portion 34, and visually recognizing the display surface 3402 via the eyepiece unit 36, and the case of removing the eyepiece unit 36 from the display portion 34, and visually recognizing the display surface 3402 directly.

In the case of using the eyepiece unit 36, the cameraman can visually recognize the display surface 3402 and first through eighth lamps 120A through 120H without being influenced by external light under a shooting environment, whereby it is sufficient for visual recognition that the display surface 3402 and first through eighth lamps 120A through 120H have low brightness, indeed, too high brightness causes the cameraman to sense glare and reduced visual recognition.

On the other hand, in the event of visually recognizing the display surface 3402 directly, external light under a shooting environment irradiates the display surface 3402 and first through eighth lamps 120A through 120H, and accordingly, in order to visually recognize the display surface 3402 and first through eighth lamps 120A through 120H clearly, it is necessary to increase the brightness of the display surface 3402 and first through eighth lamps 120A through 120H so as to handle the external light.

Therefore, with the present embodiment, an arrangement is made wherein both the brightness of a picture to be displayed on the display surface 3402 and the brightness of the first through eighth lamps 120A through 120H are changed (switched) so as to correspond to both an attached state and a detached state of the eyepiece unit 36 as to the display portion 34.

First, description will be made regarding operations for setting the brightness of a picture to be displayed on the display surface 3402, and the brightness of the first through eighth lamps 120A through 120H.

Figure 28:
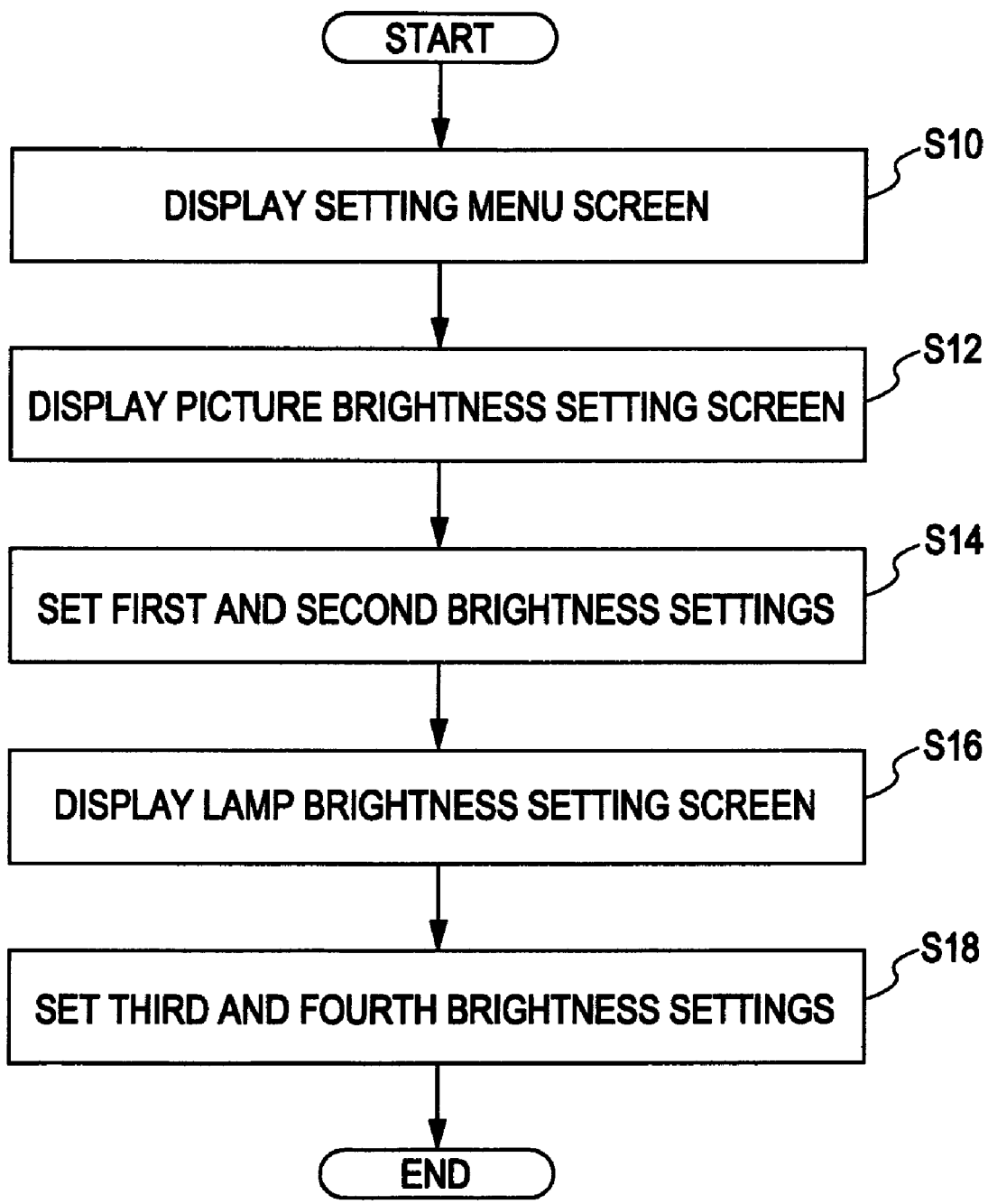
FIG. 28 is a flowchart describing the setting operation of the brightness of a picture and the brightness of first through eighth lamps 120A through 120H to be displayed on a display surface 3402.

FIG. 28 is a flowchart for describing the operations for setting the brightness of a picture to be displayed on the display surface 3402, and the brightness of the first through eighth lamps 120A through 120H.

First, in response to one of the pushbutton switches 3210C of the main unit 32 being operated, the CPU 104 displays a setting menu screen on the display surface 3402 (step S10). This setting menu screen is for performing various settings of the viewfinder 30 including brightness setting.

Next, in response to one of the pushbutton switches 3210C of the main unit 32 being operated, the CPU 104 displays a picture brightness setting screen for setting the brightness of a picture to be displayed on the display surface 3402 (step S12).

With the picture brightness setting screen, for example, an arrangement is made wherein brightness can be set by increasing/decreasing a numeric value indicating the level of brightness by operating one of the pushbutton switches 3210C, and in accordance with the numeric value being increased/decreased, the CPU 104 controls the backlight driving unit 128 to increase/decrease the light amount of illumination light of the backlight 130.

Subsequently, the first brightness which is the brightness of a picture to be displayed on the display surface 3402, which is suitable for visually recognizing the display surface 3402 by looking into the eyepiece unit 36, and the second brightness which is the brightness of a picture to be displayed on the display surface 3402, which is suitable for visually recognizing the display surface 3402 directly by removing the eyepiece unit 36, are each set (step S14).

The second brightness at the time of visually recognizing the display surface 3402 directly is influenced by external light, so this value is higher than the value of the first brightness.

The set first brightness and the set second brightness are stored in the EEPROM 106 by the CPU 104.

Next, in response to one of the pushbutton switches 3210C of the main unit 32, the CPU 104 displays a lamp brightness setting screen for setting the brightness of the first through eighth lamps 120A through 120H (step S16).

With the lamp brightness setting screen also, in the same way as with the picture brightness setting screen, an arrangement is made wherein brightness can be set by increasing/decreasing a numeric value indicating the level of brightness by operating one of the pushbutton switches 3210C, and in accordance with the numeric value being increased/decreased, the CPU 104 controls the LED driver 110 to increase/decrease the light amount of the first through eighth lamps 120A through 120H.

Subsequently, the third brightness which is the brightness of the first through eighth lamps 120A through 120H, which is suitable for visually recognizing the first through eighth lamps 120A through 120H by looking into the eyepiece unit 36, and the fourth brightness which is the brightness of a picture to be displayed on the display surface 3402, which is suitable for visually recognizing the first through eighth lamps 120A through 120H directly by removing the eyepiece unit 36, are each set (step S18).

The fourth brightness at the time of visually recognizing each lamp directly is influenced by external light, so this value is higher than the value of the third brightness. The set third brightness and the set fourth brightness are stored in the EEPROM 106 by the CPU 104. Thus, the settings of brightness are completed.

Note that such operations for setting brightness are not restricted to the operations employing the above-mentioned menu screen, so existing known various setting methods can be employed.

Figure 29:
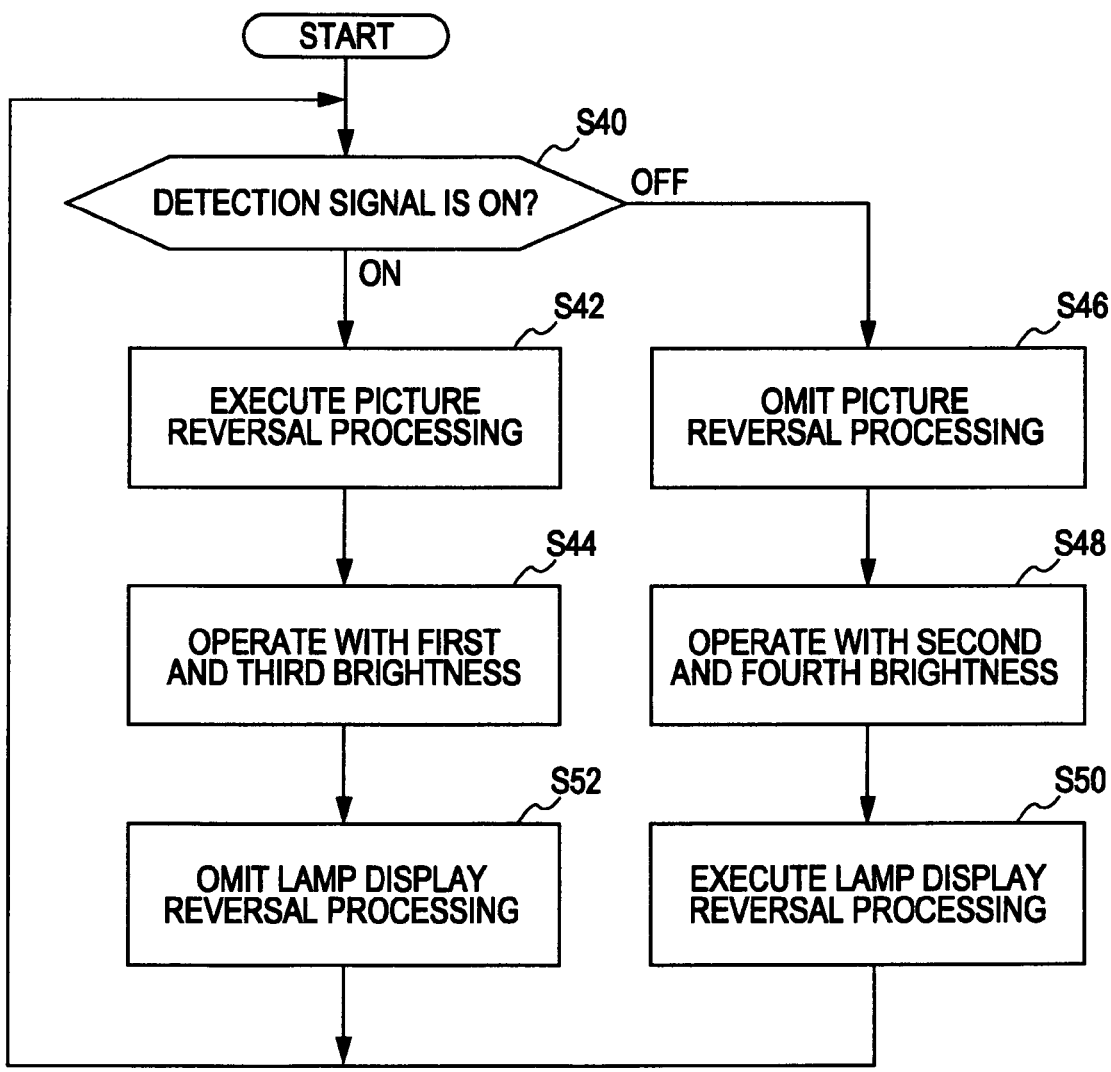
FIG. 29 is a flowchart of the adjustment operation of brightness.

Next, description will be made regarding brightness adjustment operation. FIG. 29 is a flowchart of brightness adjustment operation.

The CPU 104 monitors regarding whether the detection signal S0 from the detecting unit 122 is on or off (step S40).

In the event that the detection signal S0 is in an ON state, i.e., in the event that the eyepiece unit 36 is attached to the display portion 34, the CPU 104 supplies a control signal to the signal processing unit 118 for viewfinders to execute the picture reversal processing (step S42), controls the backlight driving unit 128 based on the first brightness stored in the EEPROM 106, and controls the LED driver 110 based on the third brightness stored in the EEPROM 106, thereby operating by taking the brightness of a picture to be displayed on the display surface 3402 as the first brightness, and taking the brightness of the first through eighth lamps 120A through 120H as the third brightness (step S44).

Further, the CPU 104 executes lamp display reversal processing for reversing the relation between turned-on positions and turned-off positions in the horizontal direction of the first through eighth lamps 120A through 120H by controlling the operation of the LED driver 110 (step S50).

That is to say, as described above, the first through eighth lamps 120A through 120H are disposed with intervals in the horizontal direction of the front face plate 5610 of the display panel 42.

In this case, in the event that the eyepiece unit 36 is attached to the supporting member 40, and the eyepiece unit 36 is removed from the eyepiece 3608, the first through eighth lamps 120A through 120H are reflected at the mirror 3601, and accordingly, the relation between turned-on positions and turned-off positions in the horizontal direction of the first through eighth lamps 120A through 120H is visually recognized in a reversed state in the horizontal direction (in a state in which the positions in the horizontal direction are interchanged).

Accordingly, the above-mentioned lamp display reversal processing is executed, and thus, the relation between turned-on positions and turned-off positions in the horizontal direction of the first through eighth lamps 120A through 120H is reversed, whereby the relation between turned-on positions and turned-off positions in the horizontal direction of the first through eighth lamps 120A through 120H can be visually recognized with the normal positional relation. Then, the flow returns to step S40.

On the other hand, in the event that the detection signal S0 is in an OFF state, i.e., in the event that the eyepiece unit 36 is not attached to the display portion 34, the CPU 104 supplies a control signal to the signal processing unit 118 for viewfinders not to execute the picture reversal processing (step S46), controls the backlight driving unit 128 based on the second brightness stored in the EEPROM 106, and controls the LED driver 110 based on the fourth brightness stored in the EEPROM 106, thereby operating by taking the brightness of a picture to be displayed on the display surface 3402 as the second brightness, and taking the brightness of the first through eighth lamps 120A through 120H as the fourth brightness (step S48).

Further, the CPU 104 controls the operation of the above-mentioned LED driver 110 so as not to execute the above-mentioned lamp display reversal processing (step S52). Then, the flow returns to step S40.

According to such an arrangement, the left and right of a picture to be displayed on the display surface 3402 is reversed, and also the brightness of a picture to be displayed on the display surface 3402 and the brightness of the respective lamps 120A through 120H are changed based on the detection by the detecting unit 122.

Accordingly, it goes without saying that a cameraman can visually recognize a picture of which the relation of the left and right positions is correct without performing particular operations in each case of the case of visually recognizing the display surface 3402 via the eyepiece unit 36, and the case of visually recognizing the display surface 3402 directly via no eyepiece unit 36, i.e., in each state of a state of attaching the eyepiece unit 36, and a state of detaching the eyepiece unit 36, and further the cameraman can visually recognize a picture having suitable brightness corresponding to the presence/absence of the eyepiece unit 36, which is advantageous to realizing improvement in operability, and also improving the visual recognition of a picture and the visual recognition of the lamps.

Also, the display of the respective lamps 120A through 120H can be visually recognized in a state in which the relation between turned-on positions and turned-off positions in the horizontal direction of the first through eighth lamps 120A through 120H is correct without performing particular operations in each state of a state of attaching the eyepiece unit 36, and a state of detaching the eyepiece unit 36, which is advantageous to realizing improvement in operability and improvement in the visual recognition of the lamps.

Also, like the imaging apparatus 10 and viewfinder 30 according to the present example, in the event that the display panel 42 is set to a standing state, and in a state in which the camera body 14 is carried on the shoulder, the cameraman is allowed to visually recognize the display surface 3402 and the lamps 120A through 120H directly, there is a possibility that the display surface 3402 and the lamps 120A through 120H may be influenced by external light, so that the cameraman cannot readily visually recognize the display surface 3402 and the lamps 120A through 120H, but according to the present example, even in the event of shooting by visually recognizing the display surface 3402 directly, the picture can be displayed with suitable brightness, and also each lamp can be displayed with suitable brightness only by removing the eyepiece unit 36 from the display unit 31, which is advantageous to realizing improvement in operability, and also improving the visual recognition of a picture and the visual recognition of the lamps.

Note that with the present example, description has been made regarding the case in which both of the brightness of a picture and the brightness of each lamp are changed based on the detection by the detecting unit 122, but an arrangement may be made wherein only the brightness of a picture is changed based on the detection by the detecting unit 122. Note however, like the present example, changing both of the brightness of a picture and the brightness of each lamp is advantageous to not only improvement in visual recognition but also improvement in ease of use by a cameraman.

Next, description will be made regarding the placement of each of the components making up the control system. With the present embodiment, a display control unit for displaying a picture on the display surface 3402 based on the first picture signals is made up of the power supply unit 102, CPU 104, EEPROM 106, buffer and low-pass filter (LPF) 108, A/D unit 112, scaler unit 114, SDRAM 116, signal processing unit 118 for viewfinders, display device driving unit 123, backlight driving unit 128, and backlight 130.

Also, a signal processing unit 111 for subjecting the first picture signal to signal processing to generate a second picture signal is made up of the A/D unit 112, scaler unit 114, SDRAM 116, and signal processing unit 118 for viewfinders.

As described above, the power supply unit 102 is provided on the first board B1, the CPU 104, EEPROM 106, buffer and low-pass filter (LPF) 108, and LED driver 110 are provided on the third board B3, the A/D unit 112, scaler unit 114, SDRAM 116, and signal processing unit 118 for viewfinders are provided on the fourth board B4, and the display device driving unit 123, backlight driving unit 128, backlight 130, and liquid crystal display device 132 are provided on the seventh board B7.

As shown in FIG. 24, with the present embodiment, the first through fourth boards B1, B2, B3, and B4 are housed in the case 3202 of the main unit 32, and the fifth through seventh boards B5, B6, and B7 are housed in the case 56 of the display panel 42.

That is to say, with the present embodiment, the signal processing unit 111 and power supply unit 102 are housed in the main unit 32, and the display device driving unit 123 and liquid crystal display device 132 are housed in the display panel 42.

According to the above-mentioned arrangement, the signal processing unit 111 handles the first picture signals as digital signals, so becomes a noise source, which provides noise to the surroundings. Also, the power supply unit 102 generates heat along with its operation.

The signal processing unit 111 and power supply unit 102 are housed in the main unit 32, and are separated from the display device driving unit 123 and liquid crystal display device 132 housed in the display panel 42.

Accordingly, the noise generated from the signal processing unit 111, the heat generated from the power supply unit 102 can be prevented from affecting the liquid crystal display device 132, which is advantageous to realizing improvement in the quality of a picture to be displayed on the display surface 3402, and also is advantageous to improvement in durability of the liquid crystal display device 132.

Also, with the present example, the display device driving unit 123 which is a device to be disposed in the vicinity of the liquid crystal display device 132 to realize simplicity of wiring, backlight 130, backlight driving unit 128, and liquid crystal display device 132 are housed in the display panel 42, and the remaining components of the control system are housed in the main unit 32, which is advantageous to realizing reduction in thickness regarding the display panel 42, and also reduction in load of weight applied to the second connecting mechanism 44 for connecting the display panel 42 to the main unit 32 so as to swing.

Next, description will be made regarding a method for using the imaging apparatus 10 and viewfinder 30. In the event that in the first attached state (FIGS. 1 and 2) or second attached state (FIGS. 6 and 7), the display portion 34 is attached to the camera body 14, and the eyepiece unit 36 is attached to the display portion 34 thereof, the cameraman can visually recognize an enlarged picture on the display surface 3402 by looking into the eyepiece 3608.

In this case, the display panel 42 and eyepiece unit 36 are moved rotationally with the first imaginary axis L1 as the center, whereby a shooting angle can be changed in the vertical direction arbitrarily.

Accordingly, for example, even in the event of carrying the shoulder pad 22 of the camera body 14 on the shoulder, or even in the event of holding the camera body 14, the cameraman can look within the eyepiece 3608 with an easy posture.

Also, as shown in FIGS. 5, 6, and 7, upon the eyepiece unit 36 being removed from the display portion 34, the display panel 42 being swung with the swing center L2 as the center to be changed to a standing state, and the display surface 3402 of the display panel 42 being directed backward, even when carrying the shoulder pad 22 of the camera body 14 on the shoulder, the display surface 3402 is directed backward, so the cameraman can view the display surface 3402 with the naked eye directly. Also, even when holding the camera body 14, the cameraman can rotate the display panel 42 with the imaginary axis L1 as the center, whereby the cameraman can view the display surface 3402 with an easy posture with the naked eye directly, and accordingly, can shoot while viewing the display surface 3402 with the naked eye directly, and changing a shooting angle in the vertical direction.

Accordingly, even when carrying the camera body 14 on the shoulder or holding the camera body 14, the cameraman can perform shooting while visually recognizing the display surface 3402 of the display panel 42 directly with an easy posture.

Next, description will be made regarding the operations and advantages of the present embodiment of the present invention. That is to say, according to the present embodiment, in the event of removing the eyepiece unit 36 from the display portion 34, and visually recognizing the display surface 3402 of the display panel 42 directly, the cameraman can set the display panel 42 to a standing state, and also can rotate the display panel 42 in a standing state on the main unit 32, whereby the cameraman can readily visually recognize the display surface 3402 of the display panel 42 without being forced with an unnatural posture, and also can change a shooting angle arbitrarily, which is advantageous to realizing improvement in ease of use.

Also, as shown in FIG. 8, according to the first connecting mechanism 38, upon the supporting member 40 being rotated 180 degrees on the main unit 32, and the display surface 3402 being directed forward with the display panel 42 as a standing state, the cameraman can take his/her own picture, or can take the picture of a subject behind the cameraman while visually recognizing the picture displayed on the display surface 3402.

Note that in this state, as shown in FIG. 5, the display panel 42 are vertically inverted as to a state in which the display panel 42 in a standing state is directed backward, so it is necessary to subject the picture to be displayed on the display surface 3402 to the above-mentioned rotation processing in order to rotate the picture 180 degrees. Also, the cameraman himself/herself becomes a subject, so it is necessary to display the picture to be displayed on the display surface 3402 as if the picture were viewed via a mirror, and accordingly, it is necessary to subject the picture to the above-mentioned mirror reversal processing in order to laterally invert the picture.

Such picture reversal processing is executed by the CPU 104 controlling the signal processing unit 118 for viewfinders in response to the operations of the operating member 3210, as described above. Accordingly, the cameraman can shoot with himself/herself as a subject, which is advantageous to improvement in ease of use of the imaging apparatus 10 and viewfinder 30. Note that this advantage is effective for both the first attached state and the second attached state of the display unit 31.

Also, as shown in FIG. 3, in a state in which the main unit 32 is attached to the camera body 14 in the first attached state, upon the display panel 42 turning to a laid state, the display surface 3402 of the display panel 42 is directed to the left lateral direction of the camera body 14.

In this state, upon the eyepiece unit 36 being attached to the supporting member 40, the cameraman can shoot in a state of carrying the camera body 14 on the right shoulder or in a state of holding the camera body 14 at the right side of the body, while visually recognizing the display surface 3402 via the eyepiece unit 36.

Also, as shown in FIG. 5, upon the display panel 42 turning to a standing state, the display surface 3402 of the display panel 42 is directed backward in the left outward direction of the camera body 14.

In this case, the cameraman can shoot in a state of carrying the camera body 14 on the right shoulder or in a state of holding the camera body 14 at the right side of the body, while visually recognizing the display surface 3402 directly.

On the other hand, in a state in which the main unit 32 is attached to the camera body 14 in the second state, upon the display panel 42 turning to a laid state, the display surface 3402 of the display panel 42 is directed in the right outward direction. In this state, upon the eyepiece unit 36 being attached to the supporting member 40, the cameraman can shoot in a state of carrying the camera body 14 on the left shoulder or in a state of holding the camera body 14 at the left side of the body, while visually recognizing the display surface 3402 via the eyepiece unit 36.

Also, as shown in FIGS. 6 and 7, upon the display panel 42 turning to a standing state, the display surface 3402 of the display panel 42 is directed backward in the right outward direction of the camera body 14. In this case, the cameraman can shoot in a state of carrying the camera body 14 on the left shoulder or in a state of holding the camera body 14 at the left side of the body, while visually recognizing the display surface 3402 directly.

Also, it is needless to say that in any of the first attached state and the second attached state as well, in the event of attaching the eyepiece unit 36 to the supporting member 40, the shooting angle can be changed in the vertical direction arbitrarily by rotationally moving the eyepiece unit 36 and display panel 42 with the first imaginary axis L1 as the center, and in the event of removing the eyepiece unit 36 from the supporting member 40, the shooting angle can be changed in the vertical direction arbitrarily by rotationally moving the display panel 42 in a standing state with the first imaginary axis L1 as the center.

Note that the top and bottom of the display panel 42 in the first attached state are reversed as to the top and bottom of the display panel 42 in the second attached state, so it is necessary to subject a picture to be displayed on the display surface 3402 to rotation processing depending on whether the current attached state is the first attached state or second attached state.

Such picture reversal processing is executed by the CPU 104 controlling the signal processing unit 118 for viewfinders in response to the operations of the operating member 3210, as described above. Accordingly, the cameraman can shoot by flexibly changing the position and posture of the display panel 42 according to a shooting environment and a shooting angle, which is advantageous to improvement in ease of use of the imaging apparatus 10 and viewfinder 30.

Second Embodiment

Next description will be made regarding a second embodiment. With the first embodiment, the rotation processing or mirror reversal processing of a picture in the case of the display surface 3402 of the display panel 42 being directed forward or backward by rotating the display panel 42 in a standing state around the first imaginary axis L1, or in the case of the main unit 32 being attached to the camera body 14 in the first attached state or second attached state, is performed by the operator operating the operating member 3210.

On the other hand, with the second embodiment, a first detecting unit 80 for detecting the posture of the display panel 42 is provided, and also a second detecting unit 90 for detecting the posture of the main unit 32 is provided, thereby performing the rotation processing or mirror reversal processing of a picture in response to the detection operation of the first or second detecting unit 80 or 90.

Figure 30:
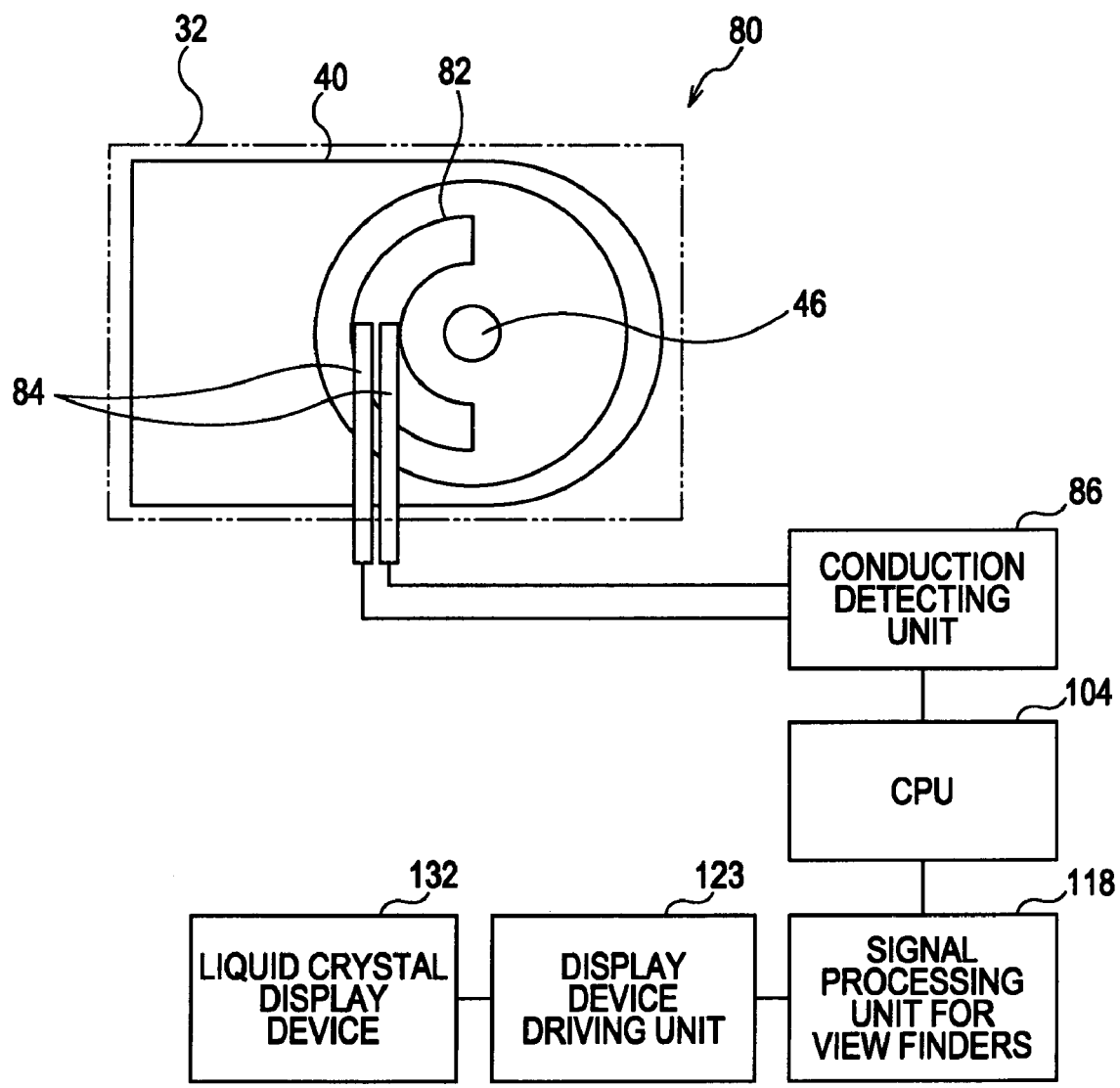
FIG. 30 is an explanatory diagram illustrating the configuration of a first detecting unit 80.
Figure 31:
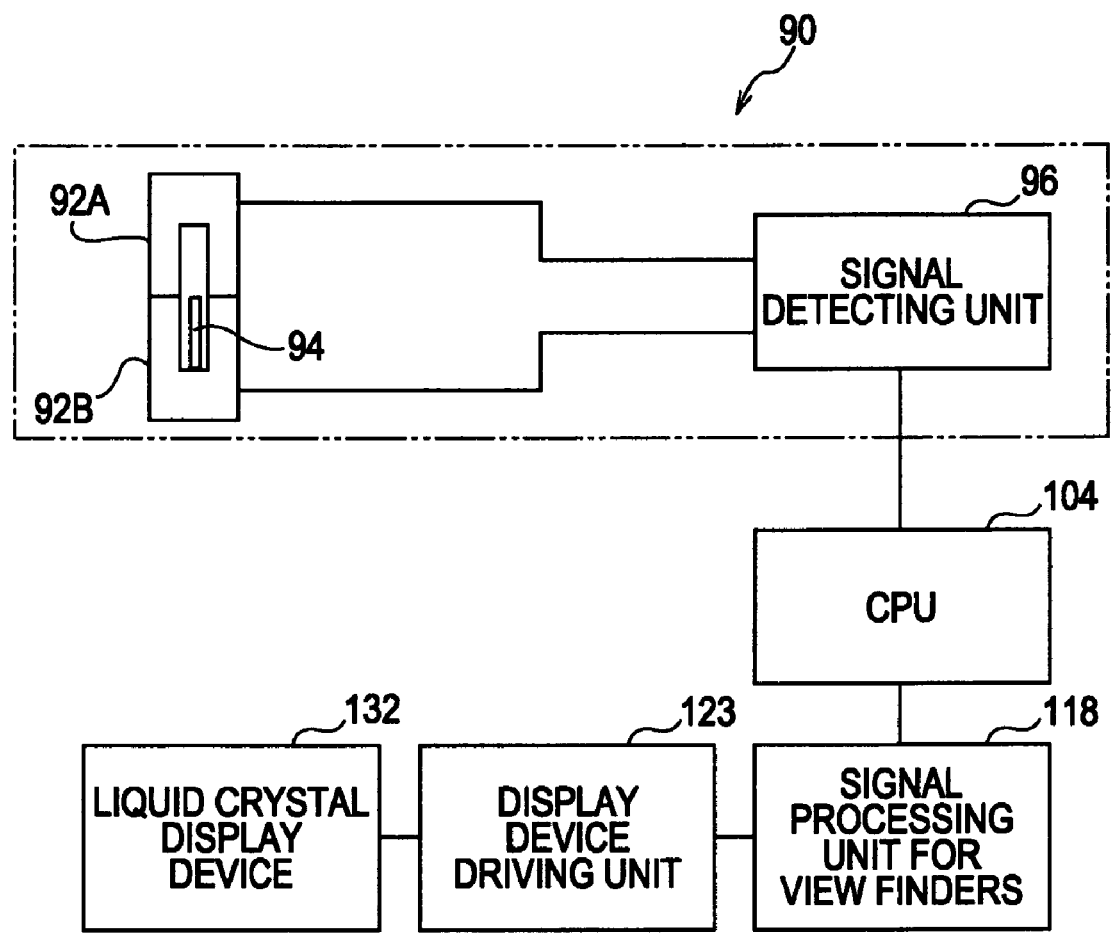
FIG. 31 is an explanatory diagram illustrating the configuration of a second detecting unit 90.

FIG. 30 is an explanatory diagram illustrating the configuration of the first detecting unit 80, and FIG. 31 is an explanatory diagram illustrating the configuration of the second detecting unit 90. Note that with the following embodiment, the same components as those in the first embodiment are denoted with the same reference symbols, and description thereof will be omitted.

As shown in FIG. 30, the first detecting unit 80 is configured so as to include an electric conduction portion 82, two sliders 84, an electric conduction detecting unit 86, and a detecting unit 122 (FIG. 24).

The electric conduction portion 82 is made up of an electric conductive pattern including electric conductive property, which is extended and formed in an arc shape within a range of 180 degrees along the circumference with the supporting shaft 46 (first imaginary axis L1) as the center, on the face positioned at one of the thickness direction of the supporting member 40.

Also, of the above-mentioned face of the supporting member 40, the portion excluding the electric conduction portion 82 is made up of a non-electroconductive material.

The two sliders 84 are made up of a material including electric conductive property, and each of the sliders 84 is provided such that the tip thereof comes into contact with the electric conduction portion 82 at two locations with an interval in the radial direction so as to slide, and the base of each of the sliders 84 is fixed so as not to move as to the main unit 32.

The electric conduction detecting unit 86 applies voltage to between the respective sliders 84, and also detects whether or not an electric current flows between the two sliders 84, i.e., whether or not there is electroconductivity of the two sliders 84, and supplies a first detection signal indicating the detection result thereof to the CPU 104.

With the present embodiment, the electric conduction portion 82 and the two sliders 84 are provided such that the two sliders 84 are in an electric conductive state within a range of 180 degrees where the display surface of the display panel 42 in a standing state is directed to one of the forward and backward directions, and the two sliders 84 are in an non-electroconductive state within the remaining angle range where the display surface of the display panel 42 in a standing state is directed to the other of the forward and backward directions.

Accordingly, in the event that the display panel 42 is in a standing state, the CPU 104 can determine whether the display surface of the display panel 42 in a standing state is directed to which direction of the forward or backward direction based on the first detection signal supplied from the first detecting unit 80.

Note that detection is made regarding whether the display panel 42 is in a standing state or in a laid state by the following arrangement.

That is to say, the CPU 104 determines whether the display panel 42 is in a standing state or in a laid state based on the detection signal S0 indicating presence/absence of the eyepiece unit 36 attached to the display portion 34, which is detected by the detecting unit 122 (FIG. 24). In other words, the CPU 104 determines that the display panel 42 is in a laid state in the event that the eyepiece unit 36 is attached to the display portion 34, and determines that the display panel 42 is in a standing state in the event that the eyepiece unit 36 is not attached to the display portion 34.

Alternatively, an arrangement may be made wherein a sensor for detecting a swing amount around the swing center L2 of the display portion 34 is provided separately, and the CPU 104 determines whether the display panel 42 is in a standing state or in a laid state based on the detection signal of this sensor. In this case, the first detecting unit 80 is configured so as to include the electric conduction portion 82, two sliders 84, electric conduction detecting unit 86, and the above-mentioned sensor.

As shown in FIG. 31, the second detecting unit 90 is configured so as to include two photoelectric switches 92A and 92B, a light shielding plate 94, and a signal detecting unit 96.

The two photoelectric switches 92A and 92B are each made up of an optical transmission type photo coupler, which are configured so as to emit detection light upon a detection area, and also receive the detection light thereof to output a detection signal, and an arrangement is made wherein when detection light is obstructed by an object positioned within the detection area, and is not received, the detection signal turns on, and when the object is evacuated from within the detection area, and detection light is received, the detection signal turns off.

With the present embodiment, the respective photoelectric switches 92A and 92B are attached to the main unit 32 integrally such that the detection areas thereof extend linearly.

The light shielding plate 94 is provided at the main unit 32 so as to move over the respective detection areas of the two photoelectric switches 92A and 92B in the extending direction of the detection areas thereof, which is configured so as to move along with its own weight within each detection area.

The signal detecting unit 96 supplies to the CPU 104 a second detection signal indicating the detection result thereof based on regarding whether the detection signal of each of the photoelectric switches 92A and 92B is on or off.

With the present embodiment, in a state in which the imaging apparatus 10 is directed to the horizontal direction, as shown in FIG. 1, upon the main unit 32 being attached to the camera body 14 in the first attached state, the light shielding plate 94 moves to the detection area side of the photoelectric switch 92B which is one of the two photoelectric switches 92A and 92B by its own weight, and thus, the photoelectric switch 92B which is one of the switches turns on, and the photoelectric switch 92A which is the other of the switches turns off. Also, as shown in FIG. 5, upon the main unit 32 being attached to the camera body 14 in the second attached state, the light shielding plate 94 moves to the detection area side of the photoelectric switch 92A which is the other of the two photoelectric switches 92A and 92B by its own weight, and thus, the photoelectric switch 92B which is one of the switches turns off, and the photoelectric switch 92A which is the other of the switches turns on. In other words, the detection of the first or second attached state by the second detecting unit 90 is performed based on the direction of the gravity applied to the main unit 32.

That is to say, the second detecting unit 90 is for detecting whether the main unit 32 is in the first attached state or in the second attached state. Accordingly, the CPU 104 can determine based on the second detection signal supplied from the second detecting unit 90 if the main unit 32 is attached to the camera body 14 in which state of the first attached state and the second attached state.

Note that upon the light shielding plate 94 being moved by change in the posture or vibration of the imaging apparatus 10 at the time of shooting, and the on/off states of the detection signals of the photoelectric switches 92A and 92B being reversed, inconvenience occurs wherein the CPU 104 determines the first or second attached state erroneously.

Therefore, it is desirable to perform the detection of the first or second attached state by the second detecting unit 90 only at the time of power-on of the viewfinder 30, whereby the erroneous determination of the first or second attached state by the CPU 104 can be securely prevented.

Next, description will be made regarding the rotation processing and mirror reversal processing of a picture in response to the detection operation of the first or second detecting unit 80 or 90.

The CPU 104 determines based on the first detection signal supplied from the first detecting unit 80 whether the display surface 3402 of the display panel 42 is directed to any of the forward and backward directions, and also determines based on the second detection signal supplied from the second detecting unit 90 if the main unit 32 is attached to the camera body 14 in which state of the first attached state or the second attached state.

Figure 32:
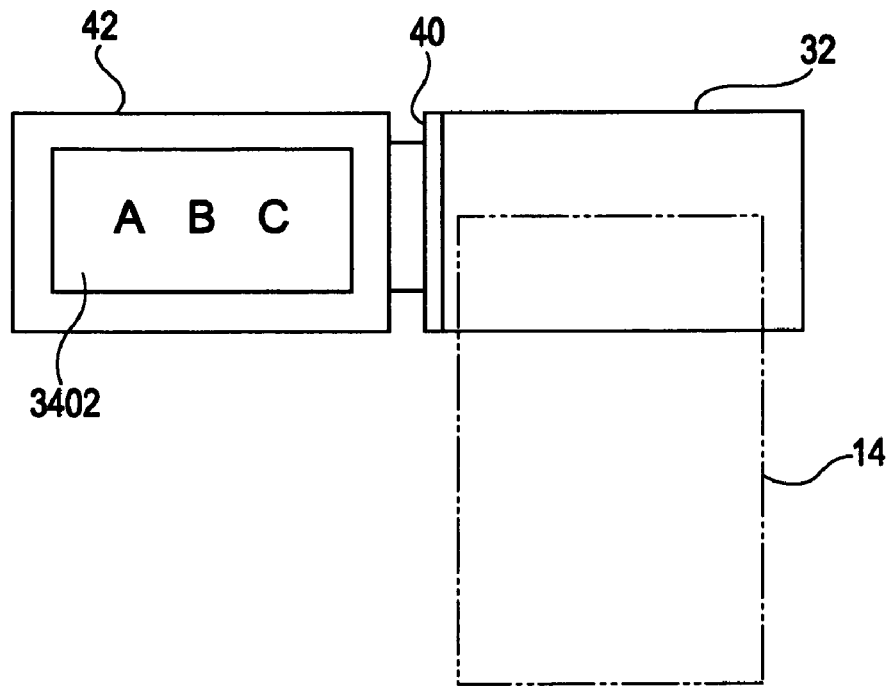
FIG. 32 is an explanatory diagram illustrating a state in which the main unit 32 is in the first attached state, and the display surface of the display panel 42, which is attached to the camera body 14, in a standing state is directed backward as viewed from the back of the imaging apparatus 10.

As shown in FIG. 32, in the event that determination is made by the CPU 104 that the main unit 32 is attached to the camera body 14 in the first attached state, and the display surface of the display panel 42 in a standing state is directed backward, the CPU 104 controls the signal processing unit 118 for viewfinders so as not to change laterally nor vertically (so as not to perform neither the rotation processing nor mirror reversal processing) a picture to be displayed on the liquid crystal display device 132 (display surface 3402). Thus, the cameraman can shoot while carrying the camera body 14 on the right shoulder, and looking into the display surface 3402.

Figure 33:
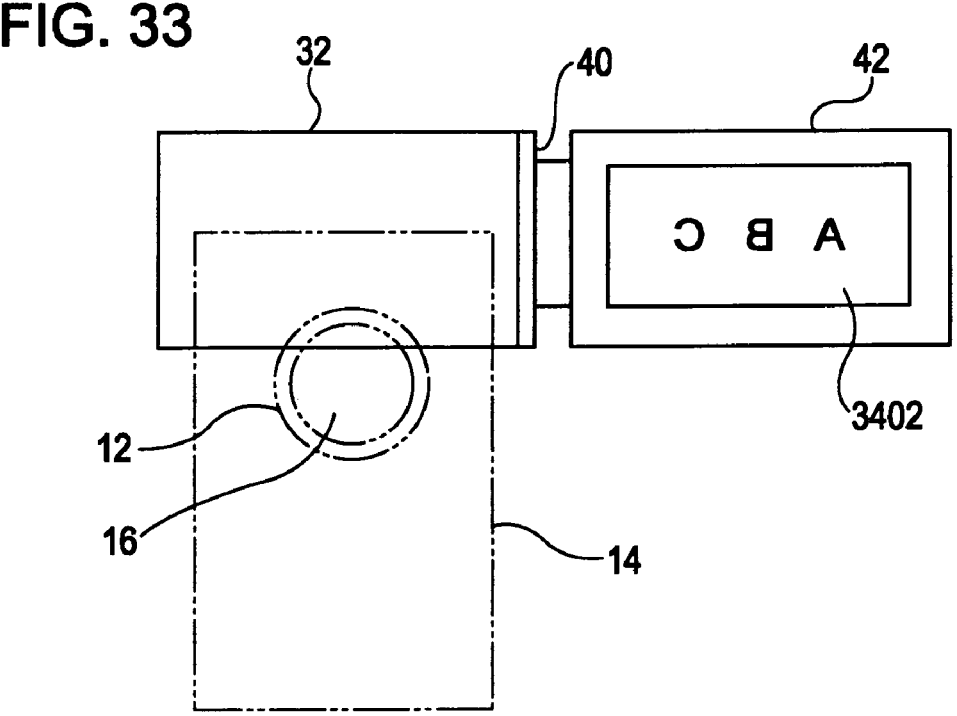
FIG. 33 is an explanatory diagram illustrating a state in which the main unit 32 is in the first attached state, and the display surface of the display panel 42, which is attached to the camera body 14, in a standing state is directed forward as viewed from the back of the imaging apparatus 10.

As shown in FIG. 33, in the event that determination is made by the CPU 104 that the main unit 32 is attached to the camera body 14 in the first attached state, and the display surface of the display panel 42 in a standing state is directed forward, the CPU 104 controls the signal processing unit 118 for viewfinders so as to perform both the rotation processing and mirror reversal processing of a picture to be displayed on the liquid crystal display device 132 (display surface 3402). Thus, the cameraman can take his/her own picture, or the picture of a subject behind him/her while visually recognizing the picture displayed on the display surface 3402.

Note that in this state, the display panel 42 is vertically inverted as to a state in which the display panel 42 in a standing state is directed backward (FIG. 32), so it is necessary to subject a picture to be displayed on the display surface 3402 to the rotation processing. Also, the cameraman himself/herself becomes a subject, so in order to display the picture to be displayed on the display surface 3402 as if the picture were viewed via a mirror, it is necessary to subject the picture to the mirror reversal processing.

Figure 34:
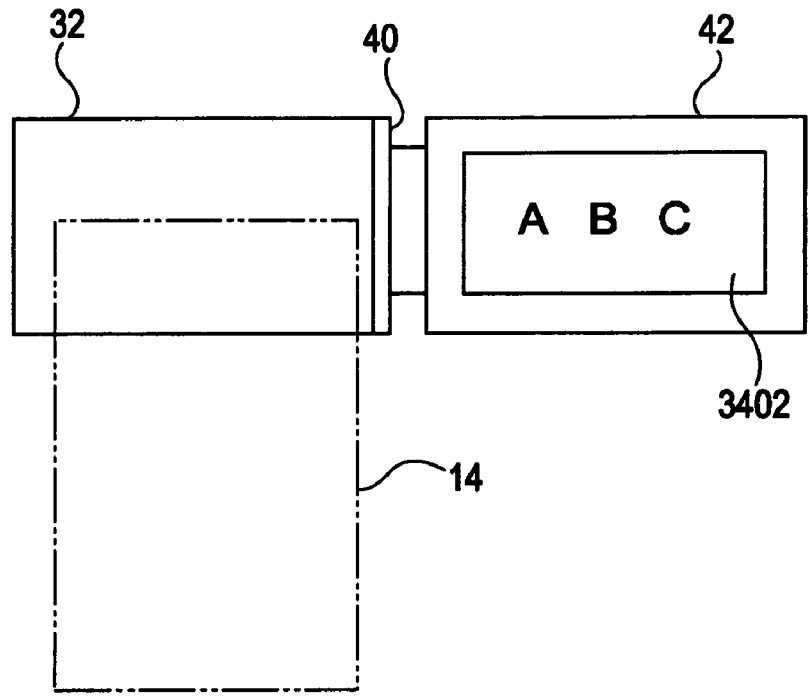
FIG. 34 is an explanatory diagram illustrating a state in which the main unit 32 is in the second attached state, and the display surface of the display panel 42, which is attached to the camera body 14, in a standing state is directed backward as viewed from the back of the imaging apparatus 10.

As shown in FIG. 34, in the event that determination is made by the CPU 104 that the main unit 32 is attached to the camera body 14 in the second attached state, and the display surface of the display panel 42 in a standing state is directed backward, the CPU 104 controls the signal processing unit 118 for viewfinders so as to execute the rotation processing of a picture to be displayed on the liquid crystal display device 132 (display surface 3402). Thus, the cameraman can shoot while carrying the camera body 14 on the left shoulder, and looking into the display surface 3402.

Note that in this state, the display panel 42 is vertically inverted as to the state in FIG. 32, so it is necessary to subject a picture to be displayed on the display surface 3402 to the rotation processing.

Figure 35:
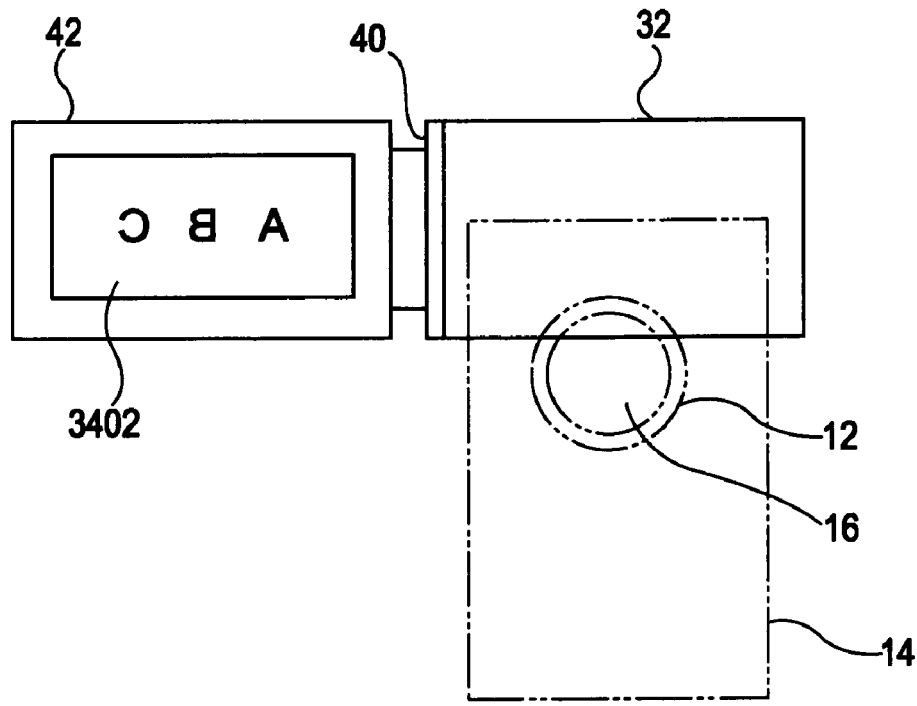
FIG. 35 is an explanatory diagram illustrating a state in which the main unit 32 is in the second attached state, and the display surface of the display panel 42, which is attached to the camera body 14, in a standing state is directed forward as viewed from the back of the imaging apparatus 10.

As shown in FIG. 35, in the event that determination is made by the CPU 104 that the main unit 32 is attached to the camera body 14 in the second attached state, and the display surface of the display panel 42 in a standing state is directed forward, the CPU 104 controls the signal processing unit 118 for viewfinders so as to execute the mirror reversal processing of a picture to be displayed on the liquid crystal display device 132 (display surface 3402). Thus, the cameraman can take his/her own picture, or the picture of a subject behind him/her while visually recognizing the picture displayed on the display surface 3402.

Note that in this state, the display panel 42 is vertically and laterally directed to the same directions as to a state in which the main unit 32 is attached to the camera body 14 in the first state, and the display panel 42 in a standing state is directed backward (FIG. 32). Note however, the cameraman himself/herself becomes a subject, so it is necessary to display the picture to be displayed on the display surface 3402 as if the picture were viewed via a mirror, and accordingly, it is necessary to subject the picture to the mirror reversal processing.

As described above, it is needless to say that according to the second embodiment, the same advantages as those in the first embodiment are effective, and moreover, in response to the detection operation of the first or second detecting unit 80 or 90, the rotation processing or mirror reversal processing of a picture is arranged to be performed, so the cameraman can automatically display a picture suitable for shooting on the display surface 3402 of the display panel 42 without any operation as to the operating member 3210 or the like depending on the forward and backward directions of the display surface 3402 of the display panel 42 in a standing state, and the first or second attached state as to the camera body 14 of the main unit 32, which is advantageous to realizing improvement in operability.

Note that with the present embodiment, description has been made regarding the case in which the first detecting unit 80 is configured so as to include the electric conduction portion 82, two sliders 84, electric conduction detecting unit 86, and detecting unit 122.

Note however, the first detecting unit can have an arbitrary configuration as long as the rotation angle on the main unit 32 of the display surface 3402 of the display panel 42 in a standing state can be detected. Note however that configuring the first detecting unit such as the present embodiment is advantageous to realizing simplification of the configuration.

Also, with the present embodiment, description has been made regarding the case in which the second detecting unit 90 is configured so as to include the two photoelectric switches 92A and 92B, light shielding plate 94, and signal detecting unit 96.

Note however, the second detecting unit can have an arbitrary configuration as long as the main unit 32 can detect if the main unit 32 is in which state of the first attached state and the second attached state. Note however that configuring the second detecting unit such as the present embodiment is advantageous to realizing simplification of the configuration.

Note that with the present embodiment, description has been made regarding the viewfinder 30 to be detachably attached to the camera body 14 of the imaging apparatus 10, but the main unit 32 of the viewfinder 30 may be provided integrally with the camera body 14, and it goes without saying that the present invention can be applied to even such an imaging apparatus 10.

It should be further noted that a primary feature of the present invention relates to a viewfinder as such, which is not restricted to belonging exclusively to a video camera or a still photography camera, and accordingly language such as "shooting" and "cameraman" should not be construed as indicating that the invention is in some way restricted to the viewfinder of a video camera, and likewise the absence of language such as "photography" should not be construed as indicating that a viewfinder of a still camera is not included in the scope of the invention.

It should be understood by those skilled in the art that various modifications, combinations, sub-combinations and alterations may occur depending on design requirements and other factors insofar as they are within the scope of the appended claims or the equivalents thereof.

What is claimed is:

1. A viewfinder comprising:
   a main unit to be detachably attached to a camera body; and
   a display unit including a display portion on which a picture to be imaged at said camera body side;
   wherein said display portion includes
   a supporting member,
   a display panel including a display surface,
   a first connecting mechanism configured to connect said main unit and said supporting member so as to rotate, and
   a second connecting mechanism configured to connect said supporting member and said display panel so as to swing between a laid state in which said display panel is laid on said supporting member and a standing state in which said display panel stands from said supporting member;
wherein said first connecting mechanism is configured such that said supporting member can rotate within a range of at least not less than 180 degrees on said main unit,
the viewfinder further comprising:
an eyepiece unit configured to enlarge a picture displayed on said display surface;
wherein the front face of said display panel is configured so as to include
a front face plate in which an opening is formed, and
said display surface provided so as to be located at the inside of said opening;
and wherein said front face plate is provided with a lamp indicating the operation state of said camera body or said display unit;
and wherein said eyepiece unit includes
a mirror configured to refract an optical path, and
an eyepiece unit side attachment portion which is detachably attached to said supporting member;
and wherein said eyepiece unit side attachment portion includes
an opening having a size corresponding to said display surface, and
a display board extending in a frame shape along the circumference of said opening;
and wherein a window portion for passing through the light of said lamp is formed at said display board in a state in which said eyepiece unit is attached to said supporting member;
and wherein characters or symbols indicating the function of said lamp are formed with mirror characters of which the relation between the left and right positions is reversed at the location corresponding to said window portion on the face of said display board which is located in the opposite direction of said supporting member.

2. The viewfinder according to claim 1, wherein the location of said front face plate corresponding to said lamp is provided with the characters or symbols indicating the function of said lamp; and wherein the characters or symbols indicating the function of said lamp are covered with said display board in a state in which said eyepiece unit is attached to said supporting member.

3. A viewfinder comprising:
a main unit to be detachably attached to a camera body; and
a display unit including a display portion on which a picture to be imaged at said camera body side;
wherein said display portion includes
a supporting member,
a display panel including a display surface,
a first connecting mechanism configured to connect said main unit and said supporting member so as to rotate, and
a second connecting mechanism configured to connect said supporting member and said display panel so as to swing between a laid state in which said display panel is laid on said supporting member and a standing state in which said display panel stands from said supporting member;
wherein said first connecting mechanism is configured such that said supporting member can rotate within a range of at least not less than 180 degrees on said main unit,
the viewfinder further comprising:
an eyepiece unit configured to enlarge a picture displayed on said display surface;
wherein said eyepiece unit is detachably attached to said supporting member in said laid state;
and wherein said eyepiece unit includes
a cylindrical housing where a mirror for refracting an optical path is housed,
an eyepiece provided on one end of said housing, and
an eyepiece unit side attachment portion which is provided at the other end of said housing, and is detachably attached to said supporting member;
and wherein attaching/detaching said eyepiece unit to/from said supporting member is performed by said eyepiece unit side attachment portion being attached/detached to/from said supporting member in said laid state;
and wherein said display panel includes
a front face, and
a back face located at the opposite side of said front face;
and wherein said front face is configured so as to include
a front face plate in which an opening is formed, and
said display surface provided so as to be located at the inside of said opening;
and wherein in said laid state, said back face is directed to said supporting member, and said front face is directed outward;
and wherein said face plate is provided with a lamp indicating the operation status of said camera body or said display unit;
and wherein said eyepiece unit side attachment portion includes
a frame portion which is pressed by the circumference of said front face plate of said display panel,
a display board extending in a frame shape along the inner side of said frame portion, and
an opening formed in said display board with a size corresponding to said display surface;
and wherein a window portion for passing through the light of said lamp is formed at said display board in a state in which said eyepiece unit is attached to said supporting member;
and wherein characters or symbols indicating the function of said lamp are formed with mirror characters of which the relation between the left and right positions is reversed at the location corresponding to said window portion on the face of said display board which is located in the opposite direction of said supporting member.

4. The viewfinder according to claim 3, wherein a plurality of said lamps are provided on said front face plate in the horizontal direction of said front face plate;
and wherein a lamp control unit configured to perform on/off control of said lamp is provided;
and wherein an eyepiece unit detecting unit configured to detect the presence/absence of attachment of said eyepiece unit as to said display panel is provided;
and wherein said lamp control unit is configured so as to reverse the relation between on and off locations in the horizontal direction of said plurality of lamps, in the horizontal direction, when said eyepiece unit detecting unit detects that said eyepiece unit is attached to said display panel.

5. A viewfinder comprising:
a main unit to be detachably attached to a camera body; and
a display unit including a display portion on which a picture to be imaged at said camera body side;
wherein said display portion includes a supporting member,
a display panel including a display surface,
a first connecting mechanism configured to connect said main unit and said supporting member so as to rotate, and
a second connecting mechanism configured to connect said supporting member and said display panel so as to swing between a laid state in which said display panel is laid on said supporting member and a standing state in which said display panel stands from said supporting member;
wherein said first connecting mechanism is configured such that said supporting member can rotate within a range of at least not less than 180 degrees on said main unit,
the viewfinder further comprising:
an eyepiece unit configured to enlarge a picture displayed on said display surface;
wherein said eyepiece unit is detachably attached to said supporting member in said laid state;
and wherein said display panel includes
a front face including said display surface, and
a back face located at the opposite side of said front face;
and wherein in said laid state, said back face is directed to said supporting member, and said front face is directed outward;
and wherein an elastic member is provided on a face where said supporting member is directed to said back face of said display panel in said laid state;
and wherein said elastic member is compressed by the back face of said display panel in an attached state in which said eyepiece unit is attached to said supporting member in said laid state.

6. A viewfinder comprising:
a main unit to be detachably attached to a camera body; and
a display unit including a display portion on which a picture to be imaged at said camera body side;
wherein said display portion includes
a supporting member,
a display panel including a display surface,
a first connecting mechanism configured to connect said main unit and said supporting member so as to rotate, and
a second connecting mechanism configured to connect said supporting member and said display panel so as to swing between a laid state in which said display panel is laid on said supporting member and a standing state in which said display panel stands from said supporting member;
wherein said first connecting mechanism is configured such that said supporting member can rotate within a range of at least not less than 180 degrees on said main unit,
the viewfinder further comprising:
an eyepiece unit configured to enlarge a picture displayed on said display surface;
wherein said eyepiece unit is detachably attached to said supporting member in said laid state;
and wherein said display panel includes
a front face, and
a back face located at the opposite side of said front face;
and wherein said front face is configured so as to include
a front face plate in which an opening is formed, and
said display surface provided so as to be located at the inside of said opening;
and wherein in said laid state, said back face is directed to said supporting member, and said front face is directed outward;
and wherein an elastic member is provided on a face where said supporting member is directed to said back face of said display panel in said laid state;
and wherein said eyepiece unit includes a frame portion capable of pressing said front face plate of said display panel;
and wherein said frame portion presses said front face plate, and said elastic member is compressed by said supporting member and the back face of said display panel in an attached state in which said eyepiece unit is attached to said supporting member in said laid state.

7. A viewfinder comprising:
a main unit to be detachably attached to a camera body; and
a display unit including a display portion on which a picture to be imaged at said camera body side;
wherein said display portion includes
a supporting member,
a display panel including a display surface,
a first connecting mechanism configured to connect said main unit and said supporting member so as to rotate, and
a second connecting mechanism configured to connect said supporting member and said display panel so as to swing between a laid state in which said display panel is laid on said supporting member and a standing state in which said display panel stands from said supporting member;
wherein said first connecting mechanism is configured such that said supporting member can rotate within a range of at least not less than 180 degrees on said main unit,
the viewfinder further comprising:
an eyepiece unit configured to enlarge a picture displayed on said display surface;
wherein said eyepiece unit is detachably attached to said supporting member in said laid state;
and wherein said display panel includes
a front face, and
a back face located at the opposite side of said front face;
and wherein said front face is configured so as to include
a front face plate in which an opening is formed, and
said display surface provided so as to be located at the inside of said opening;
and wherein in said laid state, said back face is directed to said supporting member, and said front face is directed outward;
and wherein an elastic member is provided on a face where said supporting member is directed to said back face of said display panel in said laid state;
and wherein said eyepiece unit includes an eyepiece unit side attachment portion which is detachably attached to said supporting member;
and wherein said eyepiece unit attachment portion includes
an opening of which the size corresponds to said display surface, and
a frame portion capable of pressing said front face plate off said display panel, which extends along the circumference of said opening;
and wherein said frame portion presses said front face plate, and said elastic member is compressed by said supporting member and the back face of said display panel in an attached state in which said eyepiece unit side attachment portion is attached to said supporting member in said laid state.

8. A viewfinder comprising:

a main unit to be detachably attached to a camera body; and a display unit including a display portion on which a picture to be imaged at said camera body side;

wherein said display portion includes a supporting member, a display panel including a display surface, a first connecting mechanism configured to connect said main unit and said supporting member so as to rotate, and a second connecting mechanism configured to connect said supporting member and said display panel so as to swing between a laid state in which said display panel is laid on said supporting member and a standing state in which said display panel stands from said supporting member;

wherein said first connecting mechanism is configured such that said supporting member can rotate within a range of at least not less than 180 degrees on said main unit, the viewfinder further comprising:

a picture control unit configured to control the display operation of a picture as to the display surface of said display panel; and first detecting means configured to detect a rotation angle of the display surface of said display panel in a standing state on said main unit;

wherein said picture control unit is configured so as to perform picture reversal processing for performing one or both of rotation processing for rotating said picture to be displayed on said display surface 180 degrees with an imaginary axis orthogonal to said display surface, which passes through the center of said display surface, as the center, and mirror reversal processing for laterally inverting said picture to be displayed on said display surface;

and wherein said picture reversal processing is performed based on the detection operation of said first detecting means, the viewfinder further comprising:

second detecting means configured to detect whether said main unit is in any state of said first attached state and said second attached state;

wherein said main unit has the width extending in the horizontal direction of said camera body in a state of being attached to said camera body;

wherein said supporting member is attached to one end portion in the width direction of said main unit;

wherein said main unit is attached to said camera body selectively in any state of a first attached state in which said supporting member is located at an end portion of said main unit in the width direction of said main unit and also in the left lateral direction of said camera body, and a second attached state in which said supporting member is located at an end portion of said main unit in the width direction of said main unit and also in the right lateral direction of said camera body;

wherein said picture reversal processing by said picture control unit is performed based on the detection operation of said first or said second detecting means, and wherein the detection of said first or said second attached state by said second detecting means is performed only at the time of power-on of said viewfinder.

9. An imaging apparatus comprising:

a camera body for imaging a picture, which extends forward and backward; and a display unit;

wherein said display unit includes a main unit which is detachably attached to said camera body, and a display portion on which a picture imaged at said camera body side is displayed;

and wherein said display portion includes a supporting member, a display panel including a display surface, a first connecting mechanism configured to connect said main unit and said supporting member so as to rotate, and a second connecting mechanism configured to connect said supporting member and said display panel so as to swing between a laid state in which said display panel is laid on said supporting member and a standing state in which said display panel stands from said supporting member;

and wherein said first connecting mechanism is configured such that said supporting member can rotate within a range of at least not less than 180 degrees on said main unit, the apparatus further comprising:

an eyepiece unit configured to enlarge a picture displayed on said display surface;

wherein the front face of said display panel is configured so as to include a front face plate in which an opening is formed, and said display surface provided so as to be located at the inside of said opening;

and wherein said front face plate is provided with a lamp indicating the operation state of said camera body or said display unit;

and wherein said eyepiece unit includes a mirror configured to refract an optical path, and an eyepiece unit side attachment portion which is detachably attached to said supporting member;

and wherein said eyepiece unit side attachment portion includes an opening having a size corresponding to said display surface, and a display board extending in a frame shape along the circumference of said opening;

and wherein a window portion for passing through the light of said lamp is formed at said display board in a state in which said eyepiece unit is attached to said supporting member;

and wherein characters or symbols indicating the function of said lamp are formed with mirror characters of which the relation between the left and right positions is reversed at the location corresponding to said window portion on the face of said display board which is located in the opposite direction of said supporting member.

* * * * *